RE25812

Sept. 1, 1959          M. MORGAN          2,901,927
                    AUTOMATIC MACHINE TOOL
Filed Dec. 27, 1957                    17 Sheets-Sheet 1

INVENTOR.
MARK MORGAN
BY
*James K. Morser*
AGENT

Sept. 1, 1959
M. MORGAN
2,901,927
AUTOMATIC MACHINE TOOL
Filed Dec. 27, 1957
17 Sheets-Sheet 2
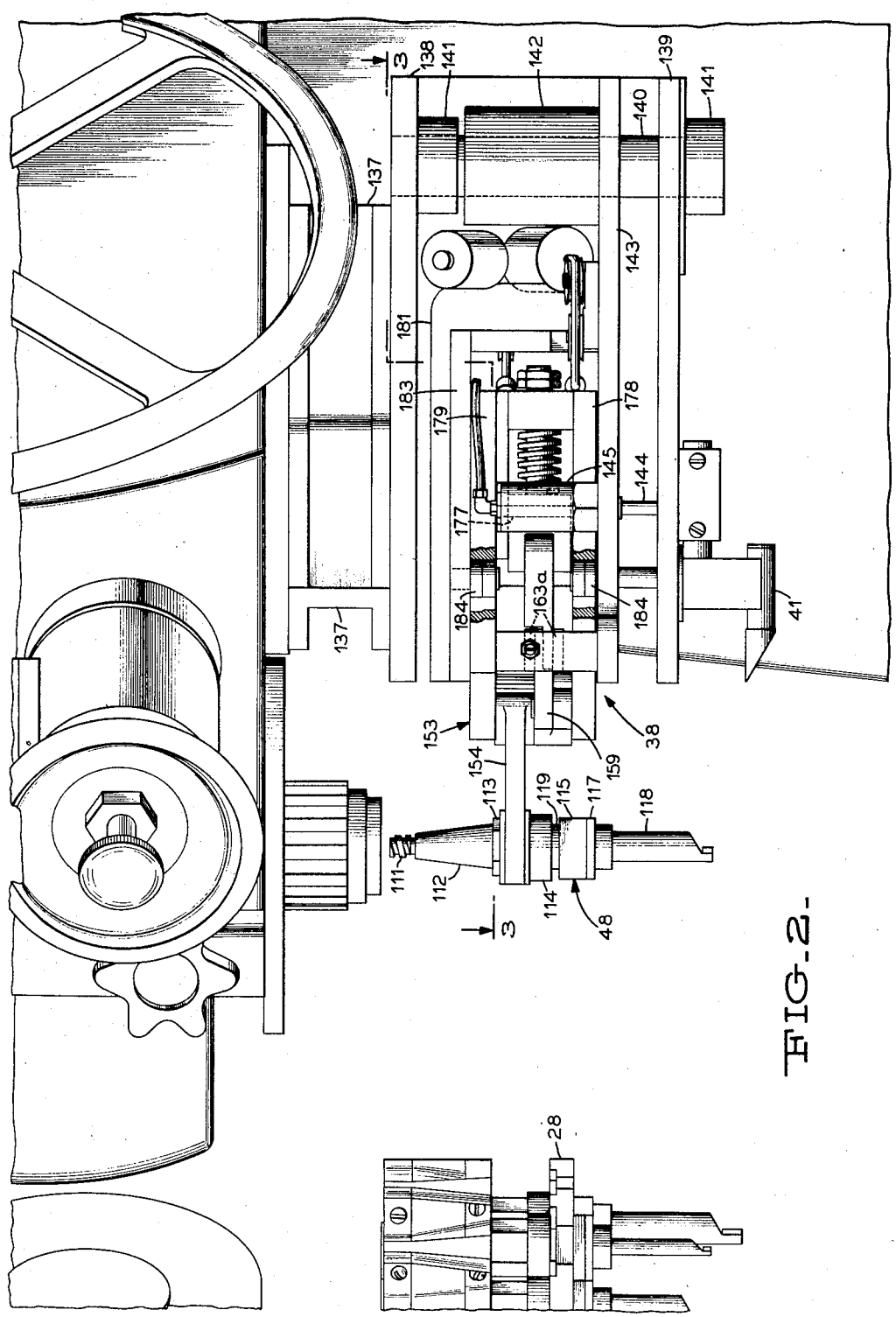
FIG-2-

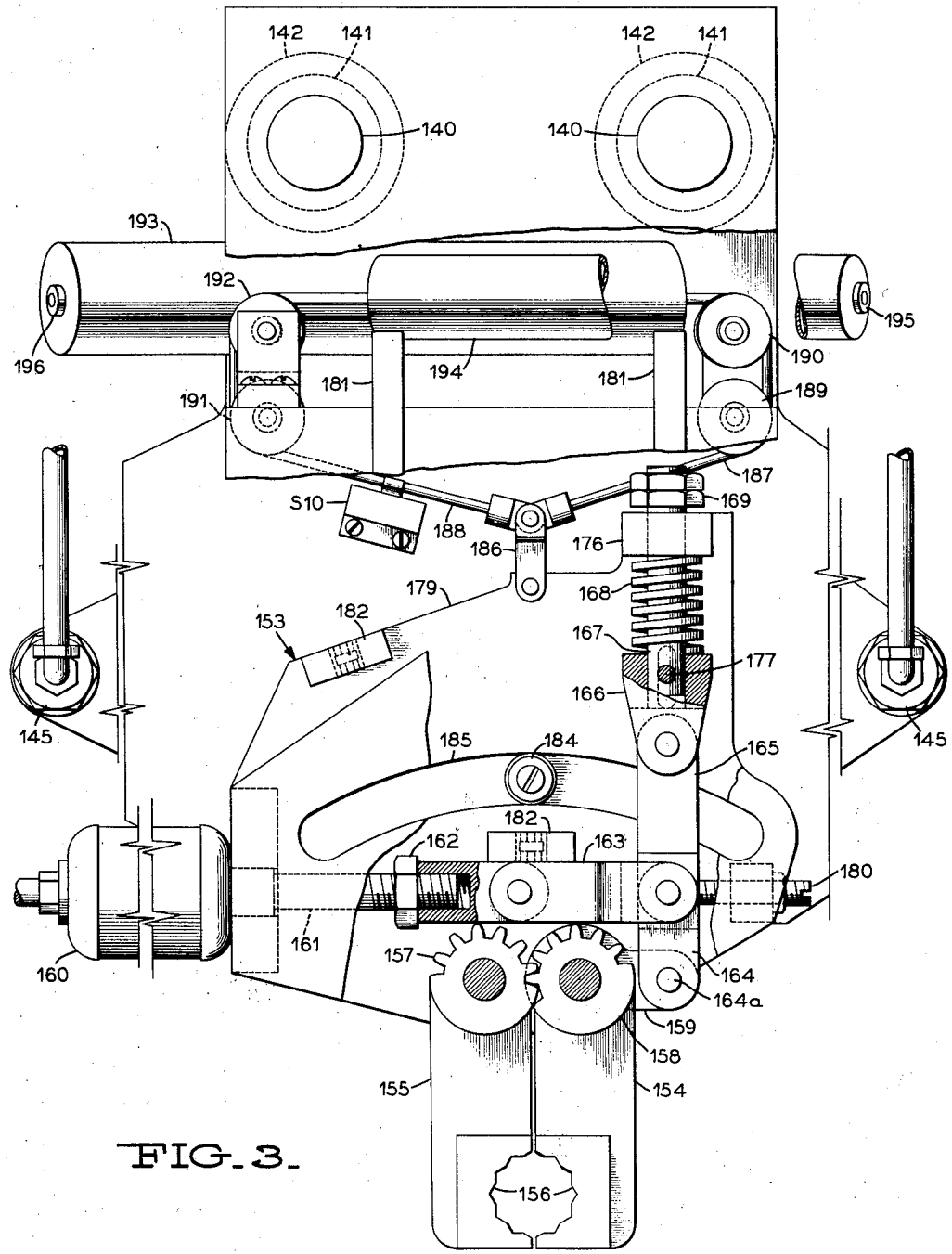
FIG_3_

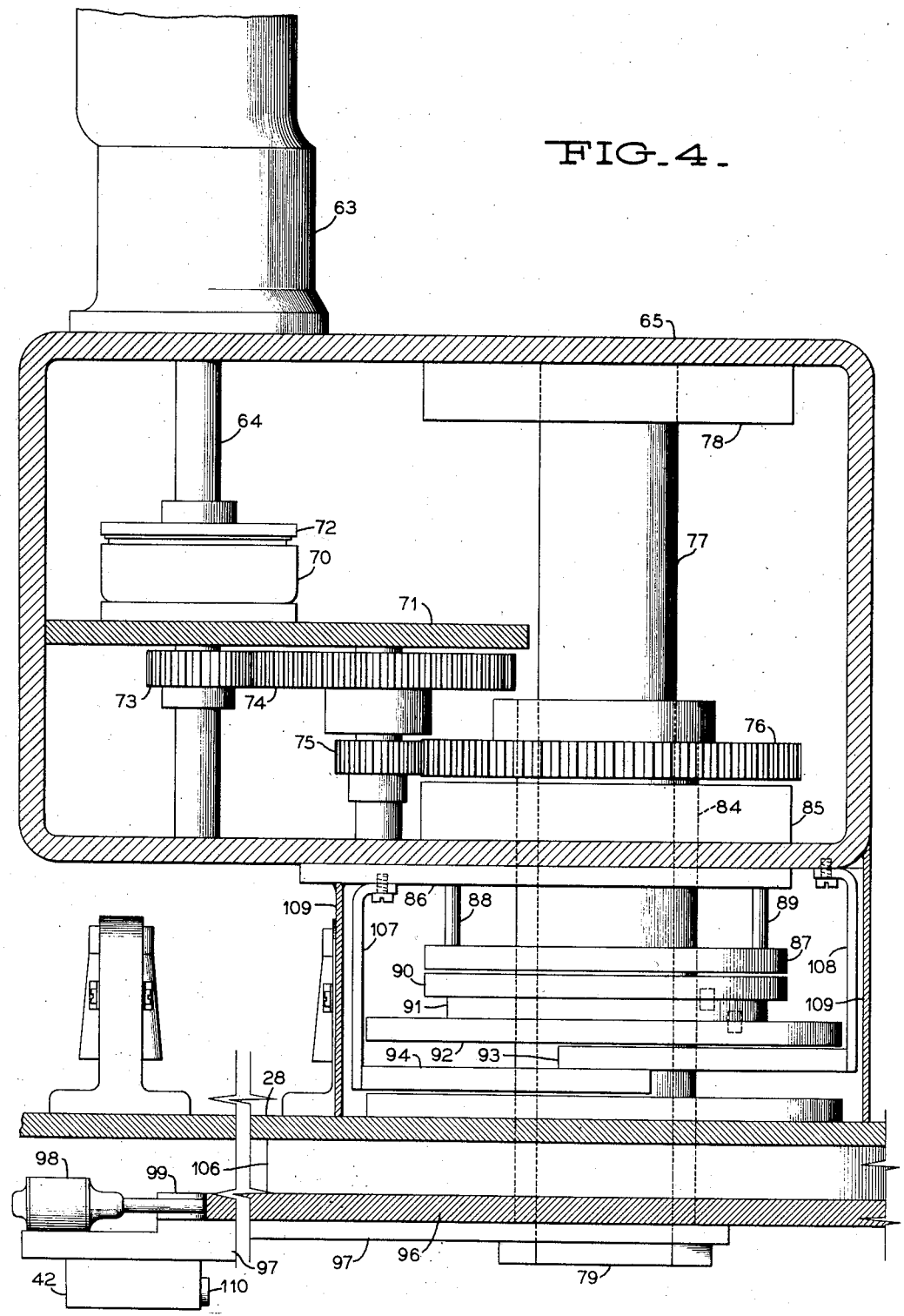

Sept. 1, 1959     M. MORGAN     2,901,927
AUTOMATIC MACHINE TOOL
Filed Dec. 27, 1957     17 Sheets-Sheet 5
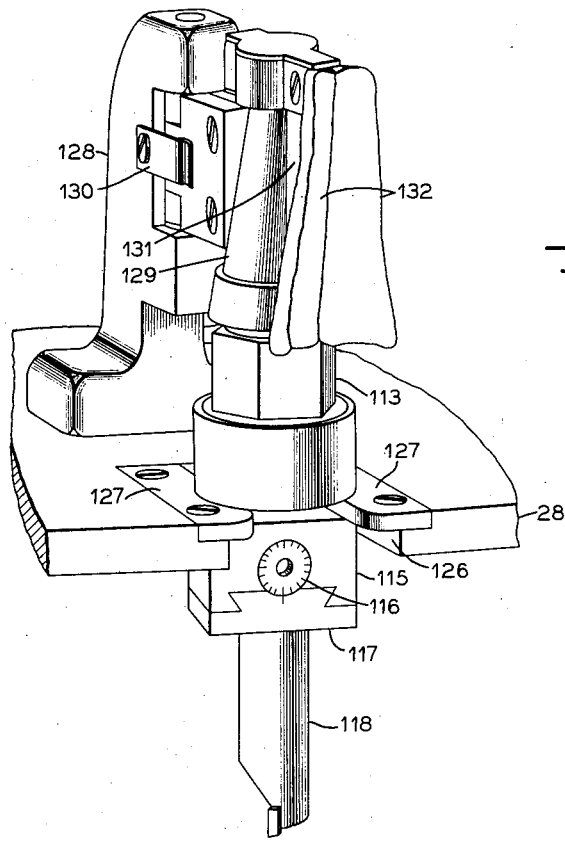
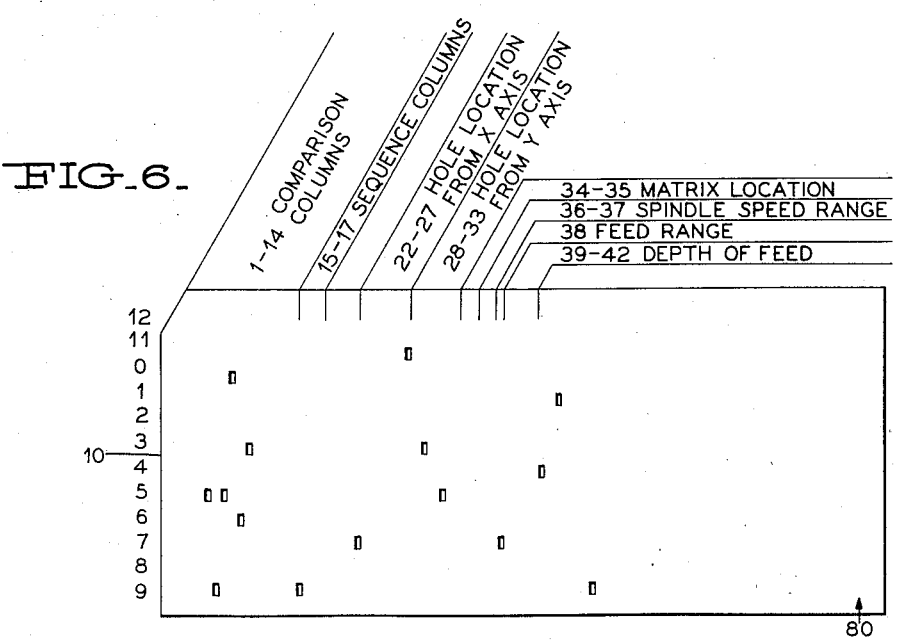

Sept. 1, 1959          M. MORGAN          2,901,927
AUTOMATIC MACHINE TOOL
Filed Dec. 27, 1957          17 Sheets-Sheet 6
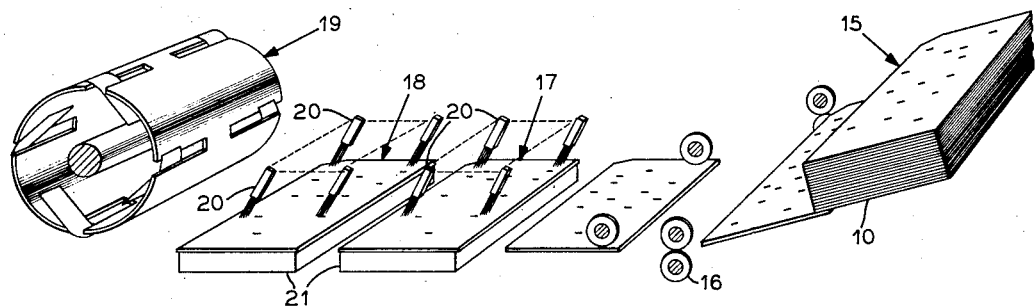
FIG_7_
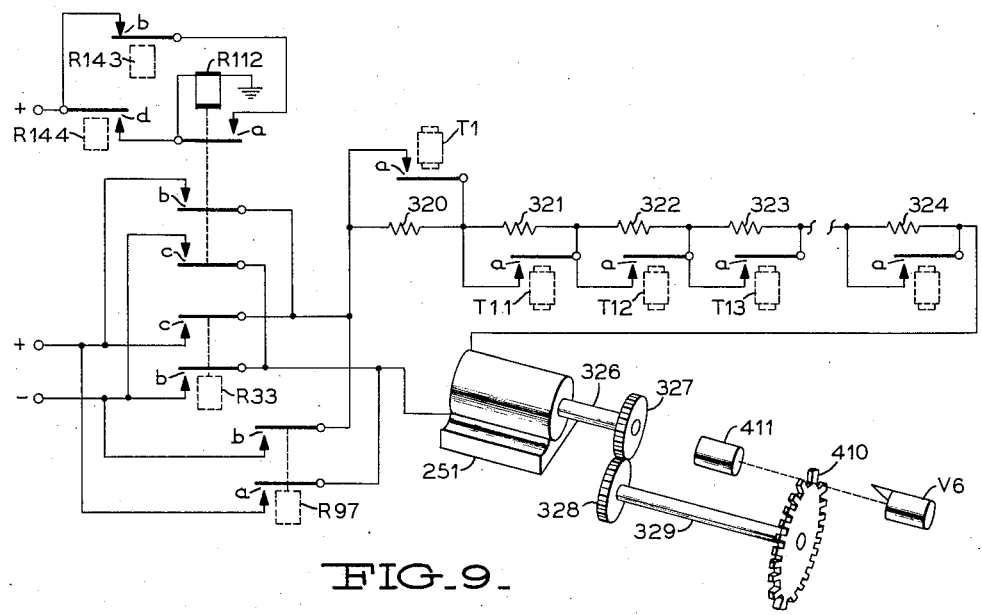
FIG_9_
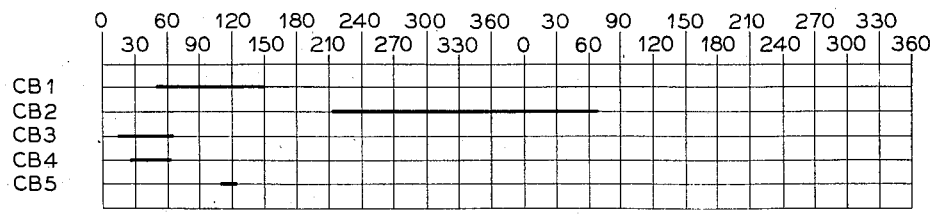
FIG_17_

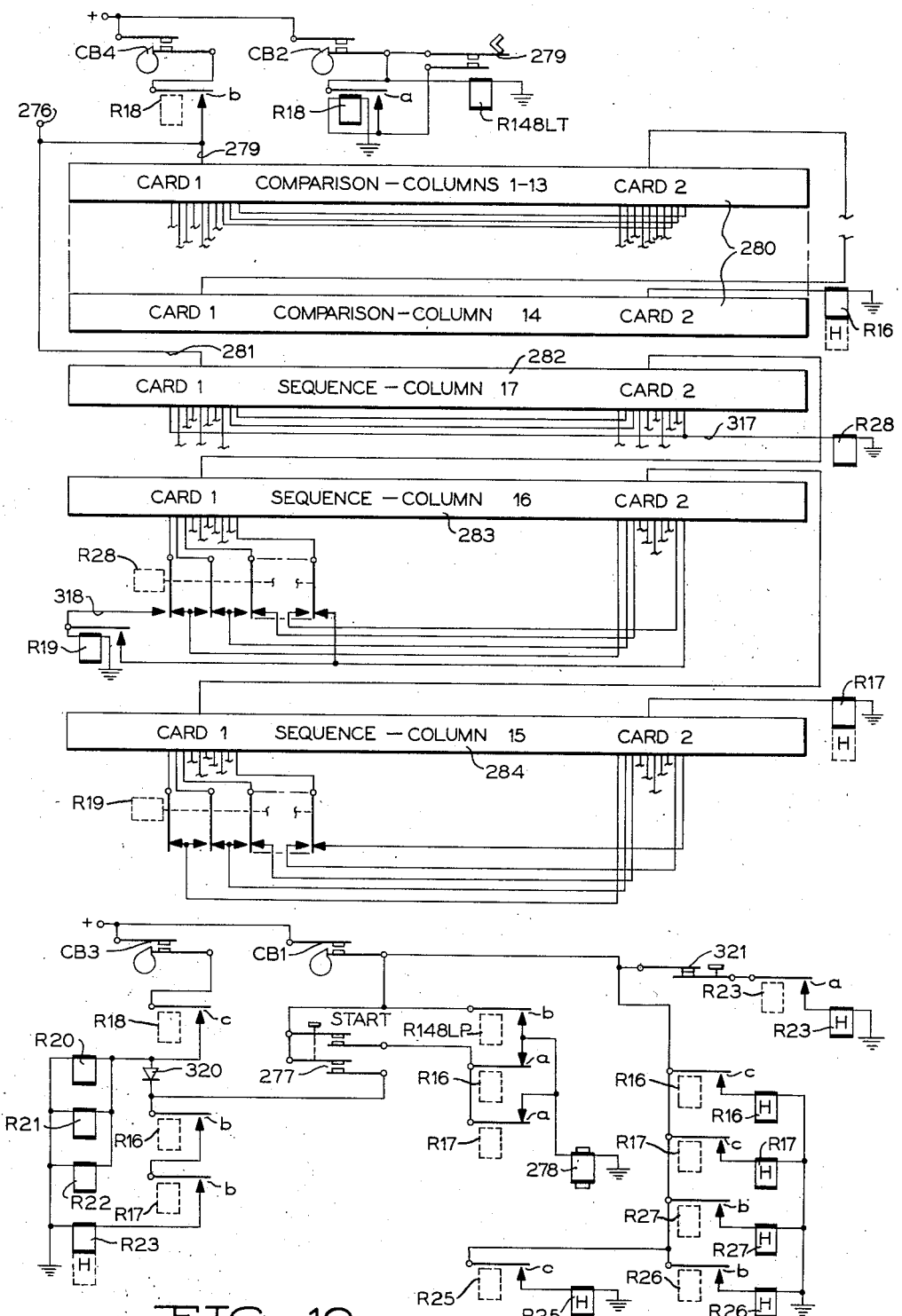
FIG_10

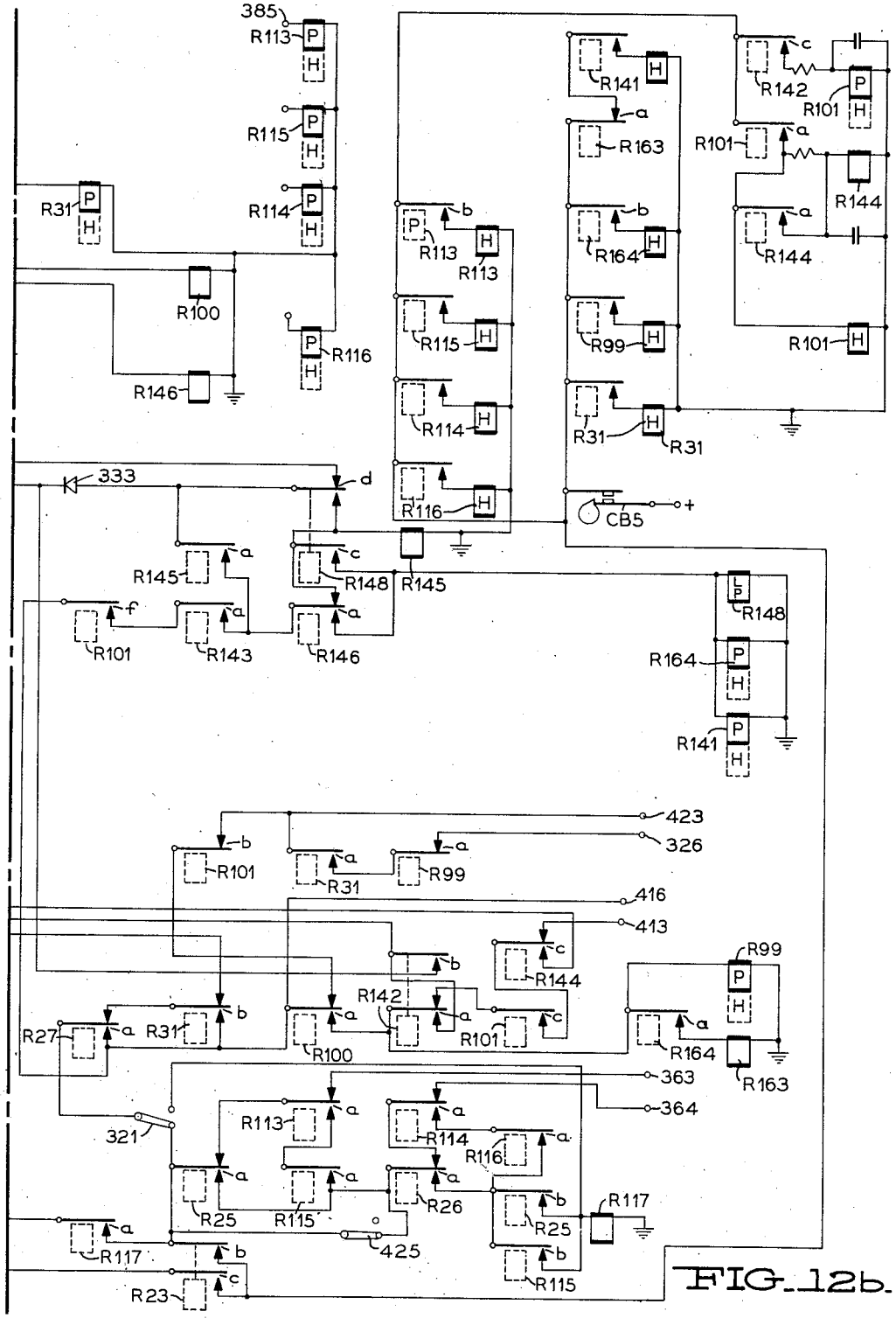
FIG_12b.

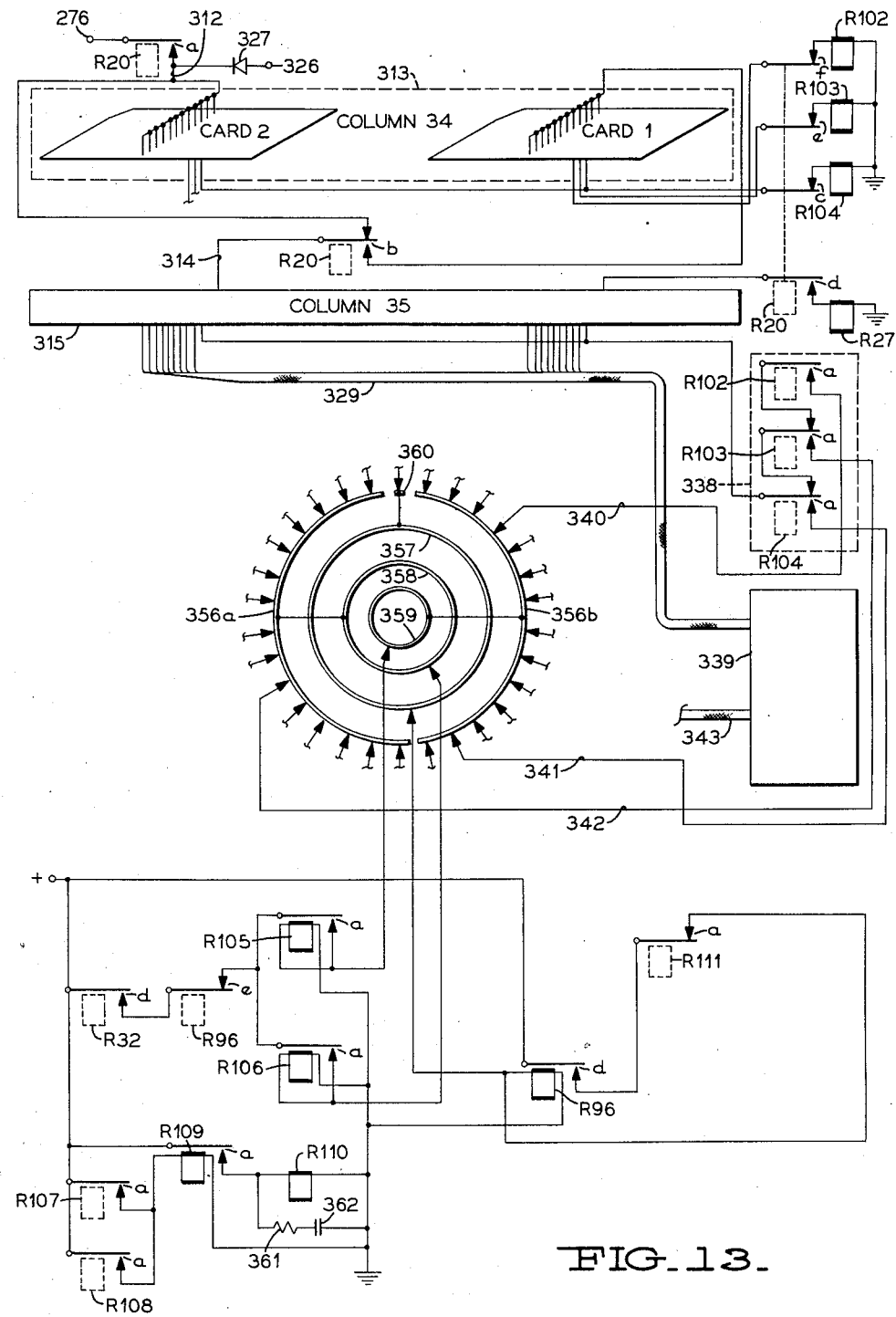

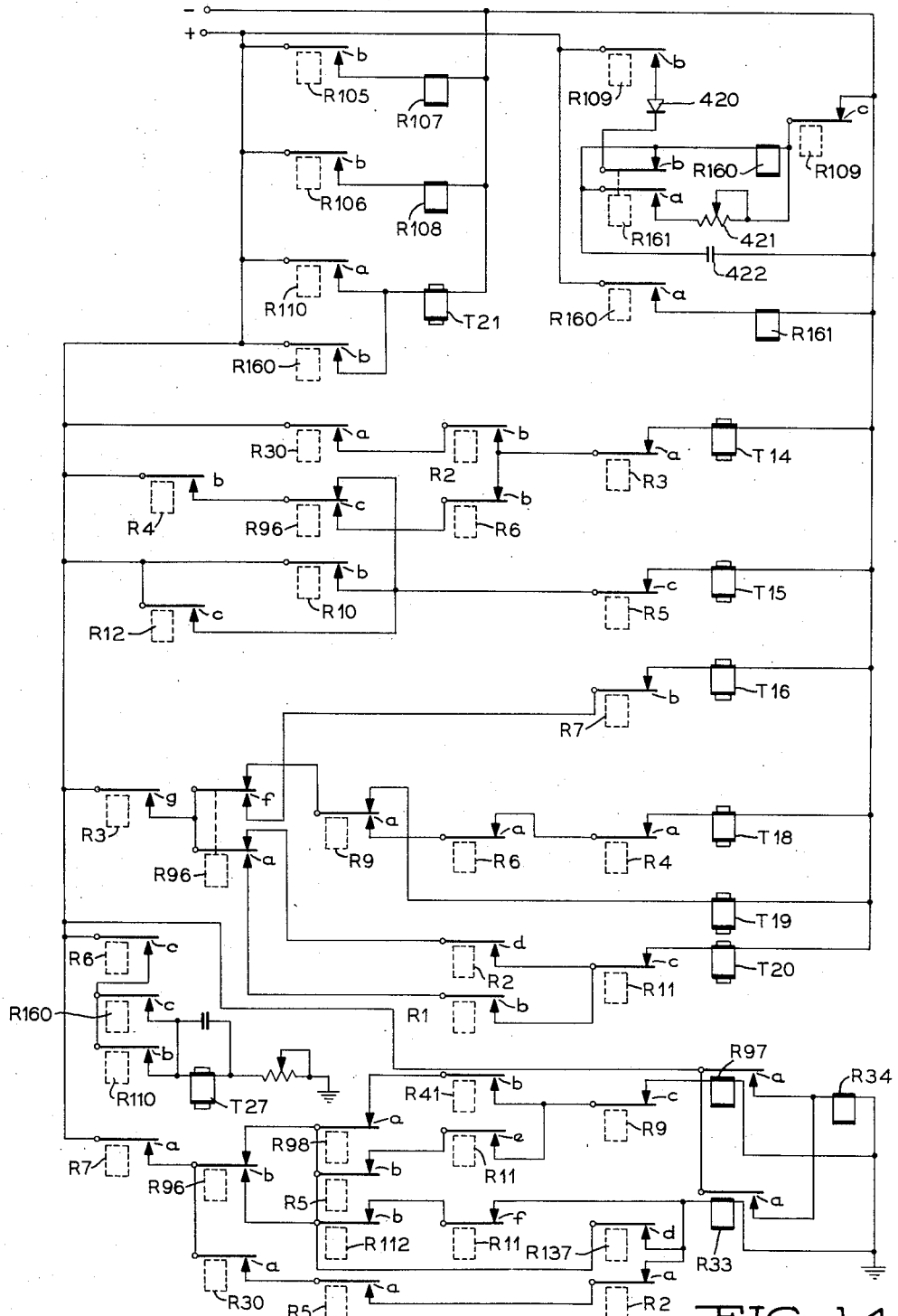
FIG_14

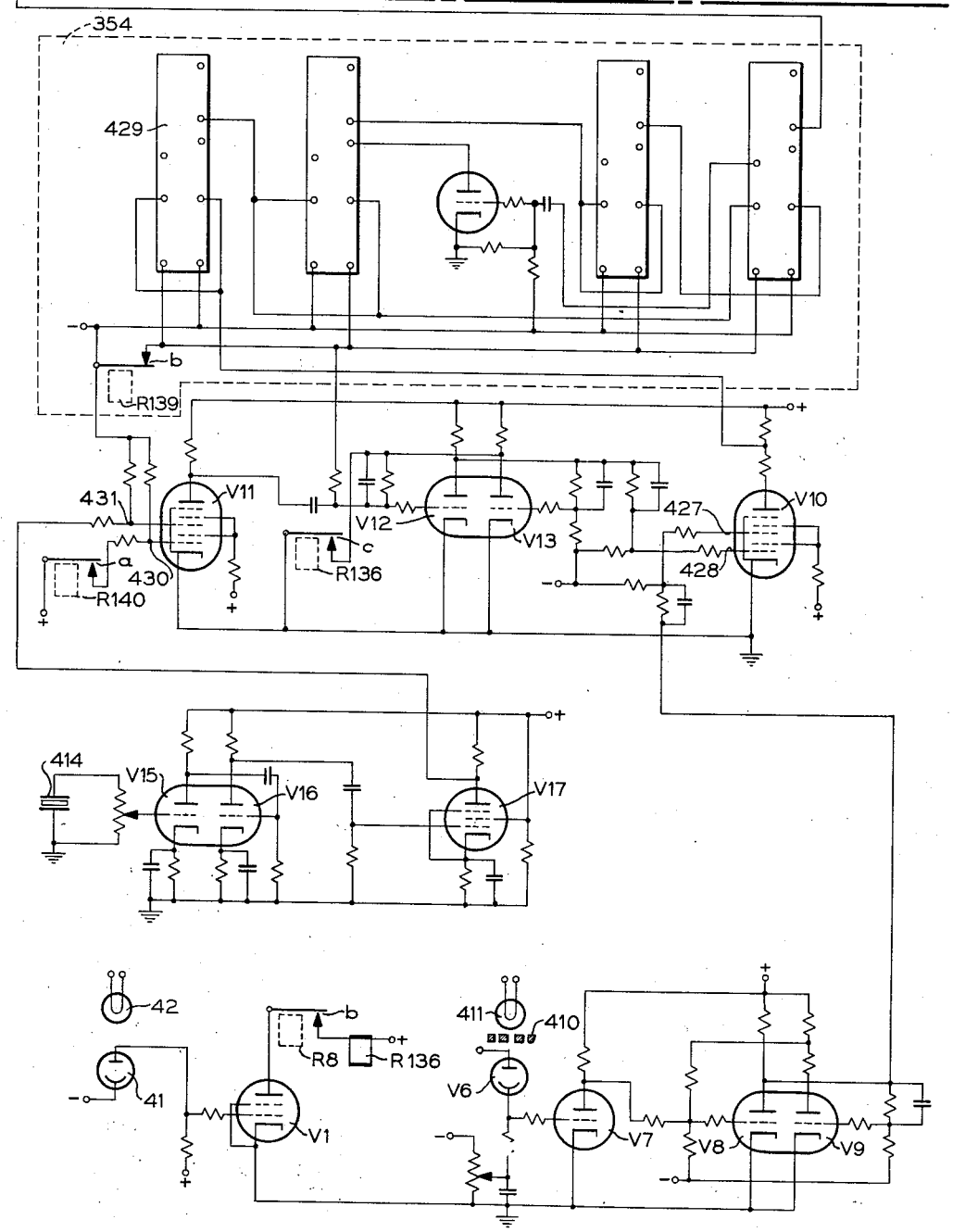
FIG_16a

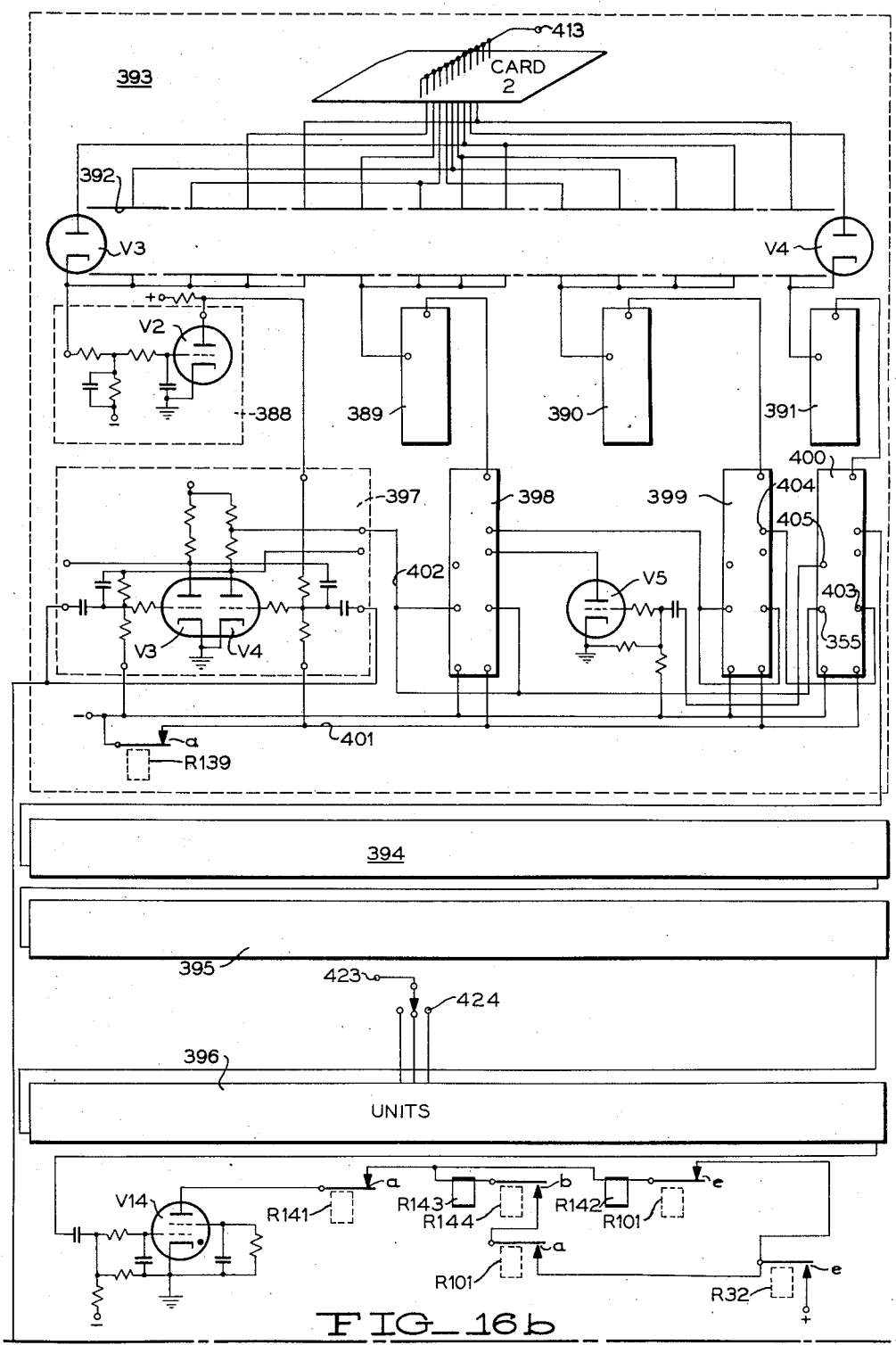

United States Patent Office 2,901,927.
Patented Sept. 1, 1959

2,901,927

AUTOMATIC MACHINE TOOL

Mark Morgan, Poughkeepsie, N.Y., assignor to International Business Machines Corporation, New York, N.Y., a corporation of New York Application December 27, 1957, Serial No. 705,701

20 Claims. (Cl. 77—4)

This invention relates to data programmed machinery and in this particular embodiment to a punch card controlled jig boring machine wherein the data from said punched card operates a controller which selects a desired tool for said jig borer, positions the jig borer table to a predetermined coordinate position, selects the correct feed and speed of the spindle and controls the depth of the boring operation to be performed by the selected tool.

In the manufacture of card feed units such as the one used in this invention and in other machinery wherein a large number of holes must be accurately bored, a jig boring machine is utilized to drill or bore these holes with a high degree of accuracy both as to location and to hole diameter. The use of these boring machines requires time consuming and laborious preparation by highly skilled operators which therefore requires both a large outlay in labor and the time of skilled mechanics. In the actual machining of the parts, continuous operator attendance is necessary and the accuracy of the finished part is in a large part dependent on the skill of the operator.

For these reasons a machine tool which has all the attributes of a precision boring machine and yet can be accurately operated with a minimum of skilled supervision is highly desirable for production work.

In boring operations where a large number of holes of variable depth and diameter are to be performed on a single workpiece, a number of variables are encountered which add to the complexity of the boring operation. Enumerating these variables it can be seen that:

A large number of tools are required for both variable hole diameter and the various operations which are performed by boring tools such as drilling, boring, counter boring, and counter sinking.

The workpiece must be accurately positioned on a coordinate basis in order that the boring operation is performed at the desired location.

Spindle feeds and speeds must be determined for each boring operation.

The depth of boring in the workpiece must be accurately determined in order to insure precision in finished pieces.

The sequence of operations in determining the holes to be bored which involve all other factors enumerated in the preceding paragraphs.

While these variables must be determined for each individual workpiece in any event, it is quite evident that there is one sequence which will result in the completion of a workpiece in a shorter time interval thany any other sequence. With present day computers and programming techniques, problems such as sequencing operations can be resolved. Even without the use of computing machinery, the problem of sequence of operations of machine tools is better carried out by persons more familiar with mathematical techniques than operators of the machine concerned.

The present invention is adapted for unit record card control wherein a single record card controls all variable data for each hole. A deck of cards is arranged for each individual type of workpiece and thus form a series of input datum to control the machine throughout its entire operation.

It is therefore an object of this invention to provide a data programmed machine tool.

It is a further object of this invention to provide a digital data programmed machine tool.

It is another object of this invention to provide a digital data programmed machine tool controlled by punched cards.

Yet another object of this invention is to provide a machine tool wherein individual tools may be selected for use in the machine under digital data control.

A further object of this invention is to provide a data reading device operable to disregard all sequential readings of identical data.

Another and further object of this invention is to provide a data programmed jig borer in which all variables of spindle feed and speed are controlled by said data.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 is a side elevation view of the wrenching mechanism and the tool storage matrix.

Fig. 3 is a top plan view of the wrenching mechansim taken along line 3—3 of Fig. 2.

Fig. 4 is a side elevation of the rotating mechanism of the tool matrix with side removed.

Fig. 5 is an isometric view of a tool carried in the tool matrix.

Fig. 6 shows the format for the punched card used in the present invention.

Fig. 7 is a schematic illustration of the card reader.

Fig. 9 shows the motor control for spindle feed.

Figs. 10 through 17 illustrate the electrical circuitry of the present invention.

Figure 1:
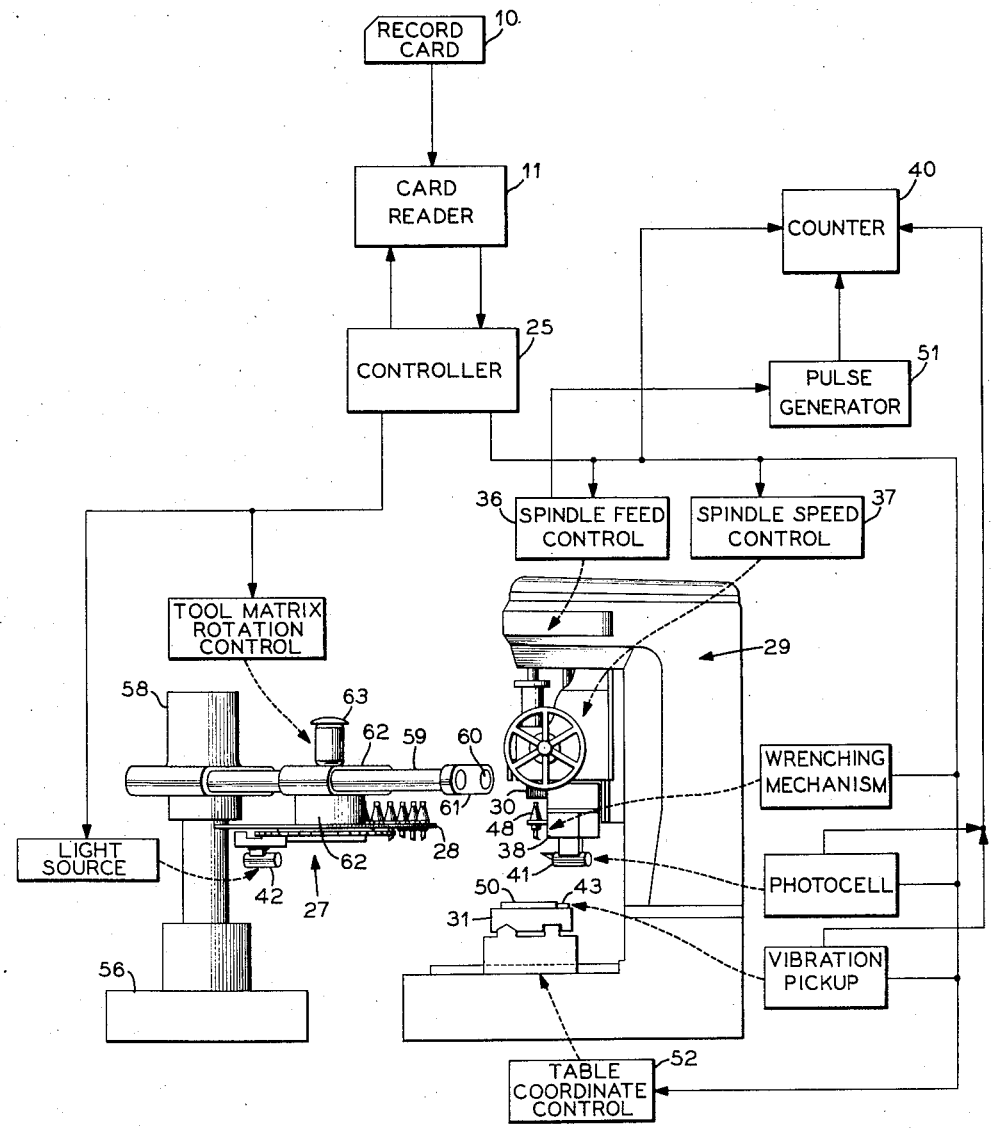
Fig. 1 is a schematic illustration of the instant invention with appended flow chart.

In providing a general description of the instant invention, reference will be made to Fig. 1 which shows the complete mechanical structure with schematic illustration of all electrical control circuitry and information flow. A more detailed description will be made hereinafter of many of the various units and their mode of operation; so for the present general explanation, a simple statement of function will be made for these.

A record card 10, such as shown in Fig. 6, is utilized to store information for operation of the jig borer with punched holes being provided at various locations which are referable to certain functions and provide magnitudes or values to be assumed by the apparatus which represents these functions. Each card 10 represents the data for one hole location.

With reference to Fig. 6, it can be seen that a punched card such as used in the present invention is divided up into 80 columns and 12 rows. By punching a hole in a selected row and column intersection, an indication is made of both value (row) and variable (column). Rows 12 and 11 are not ordinarily used in this invention since all necessary punchings can be made in rows 0–9. Row 12 and 11, however, could be used if needed.

At present, columns 1 through 49 are used for a variety of purposes in the present invention. Of the columns which have any bearing on the following description, there are:

(1) Columns 1 through 14—for comparison of cards against one another to insure that all cards belong in that deck.

(2) Columns 15 through 17—sequence number of card in deck to insure proper sequence of operations in boring operations.

(3) Columns 22 through 27—designation of hole location in X coordinate distance to six digits (XX.-XXXX) are provided.

(4) Columns 28 through 33—designation of hole location in Y coordinate distance, six digits (XX.-XXXX) are provided.

(5) Columns 34 and 35—tool storage matrix location for selection of proper tool for instant boring operation.

(6) Columns 36 and 37—spindle speed.

(7) Column 38—feed of spindle.

(8) Columns 39 through 42—depth of feed.

A card reader 11 such as shown in the patent to Page et al., Patent No. 2,484,114, is utilized to sense the holes punched in the card 10 and also the location of these punchings and transmit this data to a controller 25. Fig. 7 illustrates the card reader which consists of a hopper 15 for storing cards 10 to be read and feeding them one by one to driving rolls 16 which move the cards into a sensing station 17. On the next card reading cycle, the same card is moved into the next sensing station 18 and the card succeeding this first card is moved into the first sensing station. A card stacker drum 19 receives cards from said second sensing station and moves them to a stacker (not shown) in their proper sequence. Two reading stations are utilized to check data on succeeding cards against each other and the actual boring operation is controlled by the data from the card in the first reading station. This card is referred to as card 2 in subsequent descriptions.

Each sensing station has 960 brushes 20 (12 rows times 80 columns), one for each hole position. The brushes 20 in this invention have been connected together in each column and separate sources of potential have been provided for each column (not shown in Fig. 7) so that each column may be selectively energized at the proper time in the sequence of operations. Directly below each set of brushes is a commutator block 21 containing 960 individual segments each referable to a particular hole location. An output lead is connected from each segment to any desired point. If there is a hole at any coordinate position, a potential will be furnished to that lead when the column in which it is situated is energized.

The controller 25 contains generally all the control circuitry necessary to correlate the information transmitted from card reader 11 with the jig borer apparatus, and to route information from the card reader to the apparatus as needed. The general circuitry for the controller is shown in Figs. 10 through 16.

A tool storage matrix 27, consisting of a rotatable, laterally movable, circular plate 28 with suitable supporting structure, has notches cut into the periphery thereof for storing a plurality of tools. Electrical signals from the controller 25 determine the position of the rotatable plate 28 with respect to the jig borer 29, both rotationally and laterally, so that a particular tool may be moved in line with the jig borer and then moved laterally to a position beneath the spindle 30 of the jig borer. The details of this unit may be seen in Figs. 1, 2, 4, and 5.

The jig borer 29 is of the type illustrated in Patent No. 2,674,706 to Knosp et al. The commercial apparatus illustrated in Fig. 1 is different from the patent in a number of respects, and one of these differences is illustrated more particularly in Fig. 8. As illustrated in Fig. 1, a worktable 31 is movable on a coordinate basis to any one of a plurality of discrete positions determined by the information from the controller 25. A feed mechanism 36 is provided for moving the spindle 30 at controlled linear velocities, while a speed mechanism 37 is provided for rotating the spindle 30 at controlled angular velocities. In the present invention, both feed and speed are card controlled.

A wrenching mechanism 38 is provided beneath the throat of the jig borer 29 to accept and tender tools from and to the tool matrix 27 and spindle 30. In this operation, the wrenching mechanism may be thought of as an intermediary in exchanging tools for each subsequent operation requiring a change in tool.

An electronic counter 40 is preset by information from the card and operates to make two measurements of the travel of the spindle 30. These two measurements are controlled by a photocell 41 and light source 42 and a vibration pickup 43. The pulse apparatus 44 is illustrated schematically in Fig. 9.

CYCLE OF OPERATION

For purposes of illustration of the interrelationship of the various elements shown in Fig. 1, a tool 48 is shown held by the wrenching mechanism 38 with the spindle 30 in a raised position. This situation represents a part of the cycle of operation subsequent to the completion of a boring operation (as described in Step 3 infra) just completed by tool 48. In order to provide an understanding of the present invention, the steps of operation will be described with reference to Fig. 1.

(1) The hole boring operation has been completed and the tool 48, secured in spindle 30, is raised to a position intermediate the fully raised position of spindle 30 and the position of the wrenching mechanism which is open. Another card 10 has now been fed into the card reader 11 upon a signal that the preceding operation has been completed.

(2) The first and second cards are compared for similarities to determine whether it is necessary to change the position of the worktable 31 and/or tool 48. In this instance, it will be assumed that it is necessary to perform both operations and the controller 25 sets up proper circuits to initiate this action.

(3) The spindle feed control 36 is actuated and the spindle 30 is moved down to a position opposite the wrenching mechanism 38 which is open. The wrenching mechanism 38 then closes and grips the tool 48. The speed control 37 is actuated and the spindle rotates in a counterclockwise direction to unscrew the tool 48. The spindle is then raised by means of the feed control 36 to its uppermost position. This is shown in Fig. 1. During this period, the worktable 31 is being positioned to the desired X—Y coordinate position beneath the spindle 30.

(4) The tool storage matrix plate 28 moves to an "in" position and the tool 48 is gripped in the tool holding slot from which it originated. The wrenching mechanism 38 opens and the tool 48 is stored in the matrix plate. The matrix plate now rotates to bring the next selected tool 48 in line with the wrenching mechanism which closes upon this tool. The tool storage matrix plate 28 moves out leaving the selected tool in the wrenching mechanism.

(5) The spindle 30 moves downward in response to the feed control 36 and rotates by means of the spindle control 37 in a clockwise direction to screw the tool up into itself. After the tool is secured, the wrenching mechanism 38 opens and the tool is free to rotate with the spindle 30. At this time, the worktable should be positioned to the desired X—Y coordinate position beneath the spindle 30.

(6) If the worktable 31 is properly positioned, the spindle 30 and tool begin to move downward. Previous to this time, a predetermined number (manually set) has been entered into the counter 40 indicative of a distance from the photocell 41 toward the workpiece 50. When the tip of the tool crosses the light beam from light source 42, appropriate circuitry is selected to allow pulses from the pulse generator 51 to be entered into the counter. When the pulses into the counter equal the number preset into the counter, the vibration pickup 43 is rendered operative and the depth of the hole, as punched on the record card 10, is set into the counter. At this time, no pulses from the pulse generator are being entered into the counter 40. When the pickup 43 is rendered operative, the top of the tool is 3/16 of an inch, approximately, from the workpiece 50. This is to prevent spurious vibrations from operating the vibration pickup 43, and is the sole function of the manual setup of the counter 40 which would vary with the thickness of the workpiece.

(7) The tool is rotated and fed toward the workpiece at a predetermined speed. When the tool contacts the workpiece 50, a signal is transmitted to the counter 40 to accept pulses from the pulse generator. The feed and speed of the spindle 30 are set as determined by the holes punched in the card. When he counter 40 is satisfied by the number of pulses, and consequently the depth of the hole, the feed control is de-energized and the hole is properly bored.

(8) The spindle rotation is terminated and the spindle is fed to a position above the wrenching mechanism 38, and another card is fed into the card reader. This is the beginning of a new cycle as described in paragraph 1, supra.

DETAILED DESCRIPTION

Tool storage matrix

The tool storage matrix 27 is shown in Fig. 1 and consists in a stand 56 into which is fixed a vertically extending supporting column 57. On the uppermost section of the column is a vertically movable sleeve 58 settable to a predetermined height for alignment with said machine tool. Extending from said sleeve are a pair of ways 59 and 60 secured at their outer ends by a cap 61. On the ways is mounted a slide 62 movable to either a position adjacent the vertical sleeve 58 or adjacent the cap 61. A hydraulic cylinder and piston (not shown) furnishes the motive force for moving the slide to one position or another in response to the introduction of hydraulic pressure either in front of or behind the piston.

Suspended between ways on the slide is the rotational control mechanism 62 for the tool plate 28, see Fig. 4. As shown in this figure, a motor 63 is mounted on top of a housing 65 and has its shaft 64 extending through and journaled in the top wall. A clutch 70 is mounted on a plate 71 supported by said housing 65 and connects motion from a motor shaft clutch disc 72 to a gear 73 carried on a shaft journaled between said support plate 71 and the lower portion of said housing 65. This gear 73 forms a first gear in a series 73–76 of reduction gears. The last gear in this series 76 is mounted for rotation about a column 77 fixed from a mounting block 78 on the underside of the top portion of the housing and extending down to a nut 79 fastened on the underside of the matrix bottom plate 97.

Connected to this last gear 76 is a sleeve 84 surrounding the vertical supporting column 77 and journaled in a bearing 85 secured to the top side of the bottom portion of the housing 65. This sleeve 84 extends through the bottom of the housing, through a piece 86 secured to the housing, through a commutator disc 87 fixed to the piece 86 by members 88 and 89, through a rotatable commutator disc 90 and supporting structures 91 and 92 fixed to the sleeve, through two partial bearings 93 and 94 to the tool storage plate 28 anchored to the sleeve and to the detent plate 96 supported on a plate fixed by the vertically extending shaft.

The operation is therefore that the sleeve 84, rotatable on the vertically extending column 77, moves the rotatable commutator disc 90, the tool storage plate 28 and the detent plate 96. The commutator discs are shown in Fig. 13 with the rings 356 through 360 being mounted on the movable commutator 90 and the brushes being mounted on the fixed commutator 87. These control the rotation of the tool disc 28 by means of a control for the motor 63 to be described in connection with the electrical circuitry.

On the fixed plate 97 secured to the vertically extending column 77 is mounted an electrically controlled air operated solenoid 98 which functions to move a detent 99 into one of the serrations formed in said detent plate 96 corresponding each to an individual tool. This is to insure positive positioning of the tool storage plate 28 with respect to the jig borer spindle which is spaced apart by a spacer 106. The partial bearings 93 and 94 are fixed vertically by members 107 and 108 secured to housing 65 and plate 86, respectively. A dust cover 109 is secured to the plate 86 and housing 65 and surrounds the commutators. The light source 42 is mounted on the underside of the plate 97 and contains a lens assembly 110 for directing a beam of light toward the photocell 41, Fig. 1.

The tool 48, Figs. 2 and 5, consists of a threaded end 111 for insertion into the spindle of the boring machine, a tapered portion 112 for insuring the transmission of high torque when the tool is firmly secured in the spindle 30, a hexagonally shaped nut 113, a collar 114 directly below said nut 113 and a reduced shaft member 119 terminating in a square block 115. This combination may be machined from one piece or constructed from the elements. A screw 116 threaded in said block 115 has its threads meshing with a threaded block 117 keyed therein for relative movement to establish centering of tool bits 118 to be placed in said last-mentioned blocks 117. The tool bits per se are fastened to the lower block in any desired manner. The tool bit holders 111—117 are utilized in order to obtain a constant distance between the top of the tool storage plate 28 and the threaded portion 111 to be inserted into the spindle 30 since the tools themselves vary in length.

The slots 126 in the storage plate, Fig. 5, have keys 127 secured to the periphery of the slots 126 which slide in the way 119 formed between the collar 114 and square shanks 115 of the tool holder. A stanchion 128 is mounted on said tool storage plate 28 directly behind each slot 126 and has journaled therein two wiping sections 129 urged by flat springs 130 into engagement. These wiping members are formed to conform to the shape of the shank 112 of the tool holder and have radially extending fingers 131 containing chamois 132 for wiping the shank of the tool when it is inserted into the slot 126 for storage.

Wrenching mechanism

The wrenching mechanism 38 of the present invention is fixed beneath the head of the boring machine as shown clearly in Fig. 2, and performs two separate and distinct functions:

(1) To remove or insert a tool into the tool storage plate 28.

(2) To hold the tool for insertion into the spindle 30 or remove the tool from the spindle.

The wrenching mechanism 38 is secured by channel members 137 directly beneath the head of the boring machine 29 in any suitable manner such as by welding. As shown in Fig. 2, a tool 48 is being held by the wrenching mechanism 38 for insertion into the spindle 30 of the boring machine 29. The storage plate 28 is moved to a position removed from the spindle and will not be moved back into operative position until the tool now in the mechanism is to be replaced in the storage plate.

The wrenching mechanism 38 is formed of plates 138 and 139 spaced apart by members 140 secured to these plates by suitable collars 141. Bearings 142 are connected to a vertically movable plate 143 to allow this plate to move up and down on the members 140 under the control of piston rods 144 driven by electrically controlled air cylinders 145.

The mechanism mounted on the vertically movable plate 143 will be called the wrenching assembly 153 and is the actual mechanism used to grasp the tool. In its raised position, the jaws 154 and 155 of the wrenching assembly 153 are aligned with the hexagonal nut 113 of the tools carried in the storage plate 23 and in this position accepts or tenders the tool to or from the storage plate. The shaft 144 of cylinders 145 operates to move the assembly upwards when it is introduced therein. The assembly 153 is lowered when the spindle 30 is to accept or release a tool held by jaws 154 and 155. This feature is to allow a resilient cushion for the spindle movement in a downward position when accepting a tool and is accomplished by regulating the air flow in cylinders 145. In a like manner, when releasing a tool from the spindle, the wrenching assembly 153 hangs freely on the tool in the spindle and drops when the tool is completely unscrewed. At this time, there is of course no air pressure to the cylinders 145.

The assembly 153 consists essentially, see Fig. 3, of the jaws 154 and 155 in which is formed a series of teeth 156 which, when the jaws 154 and 155 are closed, form a wrench of a proper dimension to hold a tool nut 113 securely. Gear sectors 157 and 158 are formed on the opposite end of the jaws and mesh together to operate as a unit. The sector 158 is connected to a bell crank 159 operated by means to be presently described to connect both jaws 154 and 155 to a source of motive power 160. It can be seen that by moving the bell crank 159 to the right, the jaws will open while movement to the left will close the jaws.

An electrically controlled air cylinder 160 has a shaft 161 connected thereto for movement. This shaft 161 is connected to a member 163 and locked by means of a nut 162. Member 163 has a bifurcated portion 163a connecting shaft 161 to arms 164 and 165. The arm 164 is connected by pivot 164a to the bell crank 159. The arm 165 has connected, at its opposite end thereof, a spring biasing mechanism comprising connector 166, shaft 167 and a spring 168. This mechanism functions to control the force on the bell crank when the shaft is in its extended position and can be adjusted by a nut 169 to limit movement of shaft 167. The shaft 167 is guided by a bearing 176 and a pin 177 which is connected between plates 178 and 179, see Fig. 2.

A set screw 180 is placed adjacent the linkage formed at bifurcated member 163 to adjust the maximum permissible excursion of the cylinder shaft 161. Plate 183 is supported by means of L-shaped members 181 secured to plate 143. Between plates 143 and 183, the wrenching mechanism proper is movably mounted on bearings 182, Fig. 3, of which only two have been shown. This mechanism consists of plates 178 and 179 which are keyed to plates 143 and 183 by means of bearings 184 secured to plates 143 and 183 and riding in ways 185, Fig. 3, formed in plates 143 and 183. The ways 185 have a radius of curvature such that the center of jaws 154 and 155 forms the center point of a circle including the radius of curvature. A link 186, Fig. 3, is connected to the top plate 179 and to the bottom plate 178 and wire cables 187 and 188 are passed from this linkage around a series of pulleys 189, 190 and 191, 192 to spring biasing mechanisms 193 and 194. The spring biasing mechanisms 193 and 194 used here comprise a container holding a spring attached at one end to the cable and at the other end to an adjusting screw 195, 196 to enable the proper bias to be applied to center the movable assembly. Adjacent cable 188 is a switch S10 which is actuated by movement of cable 188 when the assembly moves in a clockwise direction, looking at Fig. 3. This switch S10 is connected to a relay R10, Fig. 12a, which controls the electrically operated air cylinder 160 and is adapted when operated to release the air pressure to cylinder 160.

When the tool holder is being drawn into spindle 30 by the engagement of the internal thread of spindle 30 with the external thread of the tool holder, the external taper of the tool holder contacts the internally matched taper of the spindle resulting in a large increase in torque to cause movement of this mechanism in a clockwise direction around the center point of the jaws 154 and 155 and consequently actuation of the switch S10 which in turn, through circuitry to be described, releases the pressure to the air cylinder 160. This action permits the tightening of the tool into the spindle of the jig borer to a degree determined by the spring bias which is placed on the cables 187 and 188 by the mechanism 194. Upon release of the tool holder, the spring tension returns the mechanism to a central position.

In releasing a tool in the spindle, the movement of the assembly 178 and 179 in a counterclockwise direction will not cause actuation of the switch S10 and the tool will be loosened and held by the mechanism.

*Digital positioning system of jig borer*

Figure 8:
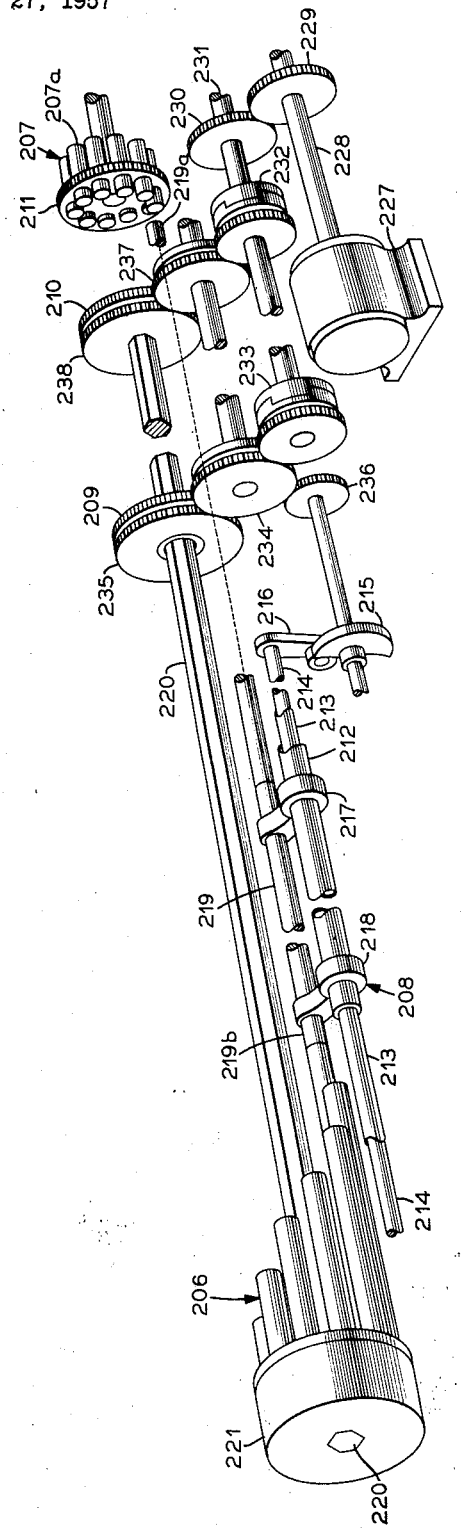
Fig. 8 shows schematically the gauging rods of the boring machine.

In Fig. 8 is illustrated the means by which the jig borer worktable is positioned to a predetermined coordinate position. In the patent mentioned previously, the method of positioning the worktable was to insert rods of predetermined lengths into a trough and then to move the worktable such that the rods were compressed between an end of the machine and the worktable itself which would give a great degree of accuracy. In the present commercial embodiment of the Fosdick boring machine, six series of rods are held on circular members of which three, 206, 207 and 208, have been shown in Fig. 8. The rods have indicator dials for visually determining the setting of the rods of which two, 209 and 210, have been shown. The remaining orders have similar devices but are not shown for simplification purposes. The fractional decimal gauging rods of which there are four (only 207 being shown) are arranged adjacent the end of the machine. Each gauging rod, e.g., 207a in each set has a basic length of two inches and is movably centered by a spring (not shown) in the discs 211 as shown at the extreme right so that the discs may be freely movable. Added on to the basic length of two inches for each rod in a given series of rods is the decimal increment. In the largest fractional decimal, i.e., .0 to .9, the rods would vary from 2.0 to 2.9 inches in length. For the next order of fractional decimal, the lengths of the rods would vary from 2.01 to 2.09. When the rods are lined up for a predetermined decimal measurement and are compressed together, the springs will give and a solid rod-like gauging member will be formed. The tens rods 208 are supported on three separate shafts operated by means of cam followers and linkage arms of which only one pair 215 and 216 has been shown. These tens measuring rods, such as 219, are spring held in brackets such as 217 and 218, as shown, but each end 219a is proximate the decimal gauging rods 207 at the right so that the table may move in to contact the extreme left-hand side 219b of the 10-inch rods to move the decimal rods together. The units rods 206 are shown mounted on the extreme left and are secured to the worktable itself and are driven by means of a hexagonal shaft 220 sliding freely through the center of the gauge rod holder. This allows for all elements to be lined up and the units rods 206 to do the actual pushing together to form the combined gauging rod which is desired.

In mechanizing this apparatus, a motor 227 drives a shaft 228 having a gear 229 mounted thereon which meshes with a gear 230 mounted on a shaft 231 on which a number of clutches, e.g., 232, 233, are mounted which in turn drive further gear trains, e.g., 234, 235, 236, 237, 238, which are connected to the respective gauging rods.

The clutches, 232, 233, etc., are normally not operated for movement of the related gear train. When a clutch is operated by de-energization, the desired gauging rod is moved into position in the gauging slot. Around the periphery of the dials 209, 210, etc., or mounted as separate units are the emitters shown in Fig. 11b. When it is desired to move a particular set of gauging rods to a desired measurement, potential is applied to a particular point on the emitter which in turn removes the potential from the solenoid actuated clutch, e.g., 232, and allows the dials to turn until they reach the contact to which the potential is applied which in turn energizes the clutch, stopping further rotation. In this clutching application the clutches are energized to stop rotation. After all electrodes are thus energized, the motor stops and a time delay eventually disconnects the potential from the clutches.

DETAILED ELECTRICAL CIRCUITRY AND OPERATION OF MACHINE

The electrical circuit components illustrated in Figs. 9 through 16 each performs a predetermined function in the cycle of operation in a manner which will be apparent when the circuit is traced out for a typical operation of the jig borer. In most cases, the functions are performed by relays having as many points as are necessary to complete circuits to perform the desired function. In the case of mechanical apparatus which is involved with the relay circuitry, some digression will be made to explain the operation of the apparatus when, in the cycle of operations, the need arises for such discussion.

Figure 11A:
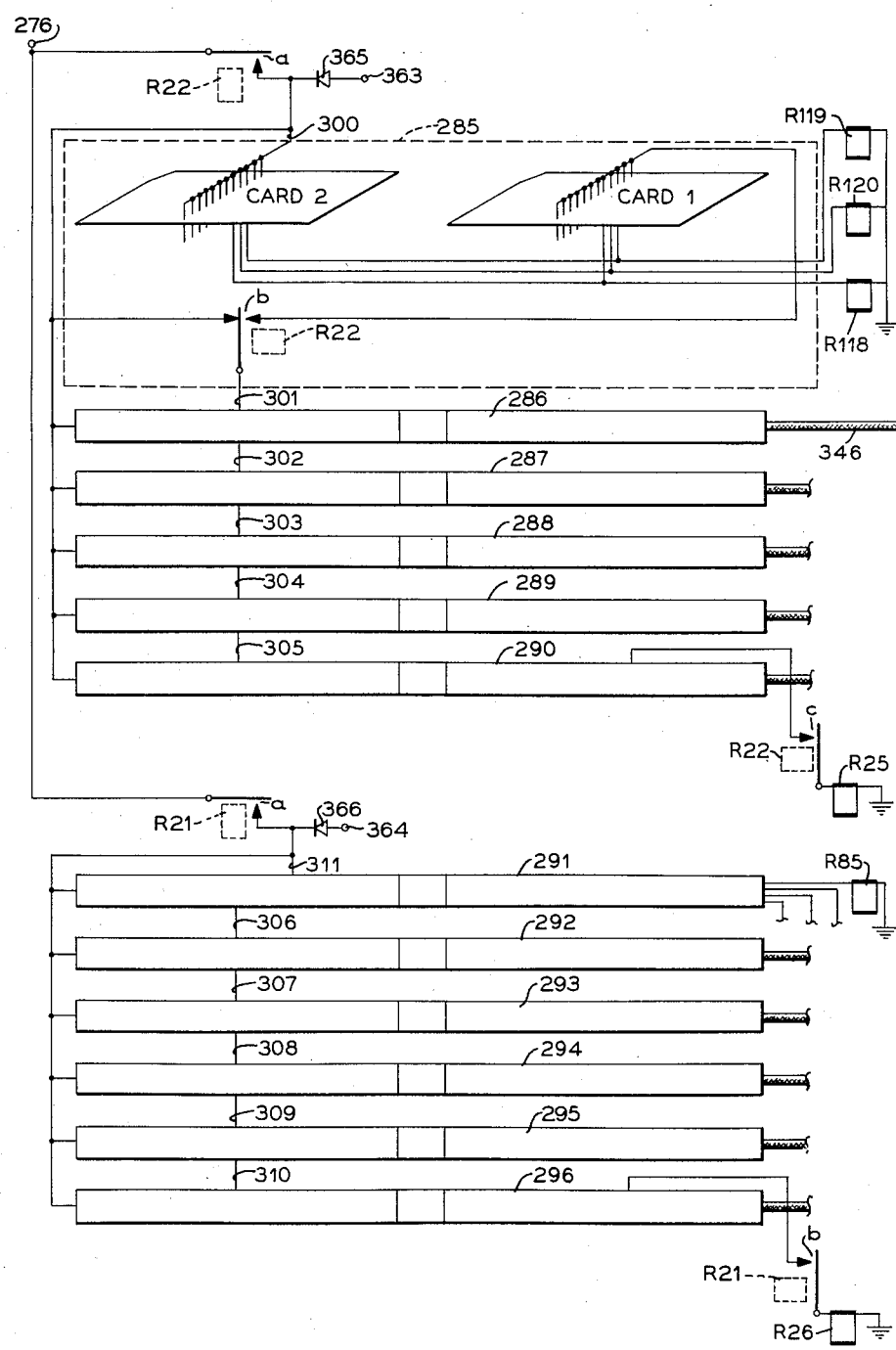

The brush sensing arrangement of Fig. 7 has been repeated diagrammatically in Figs. 10, 11a, 13, 15 and 16b in order to show specifically how the sensing is arranged for each variable punched on the card. Fig. 11a particularly well shows how the brushes are connected in parallel across one card column with an individual output lead for each individual brush.

Figure 12A:
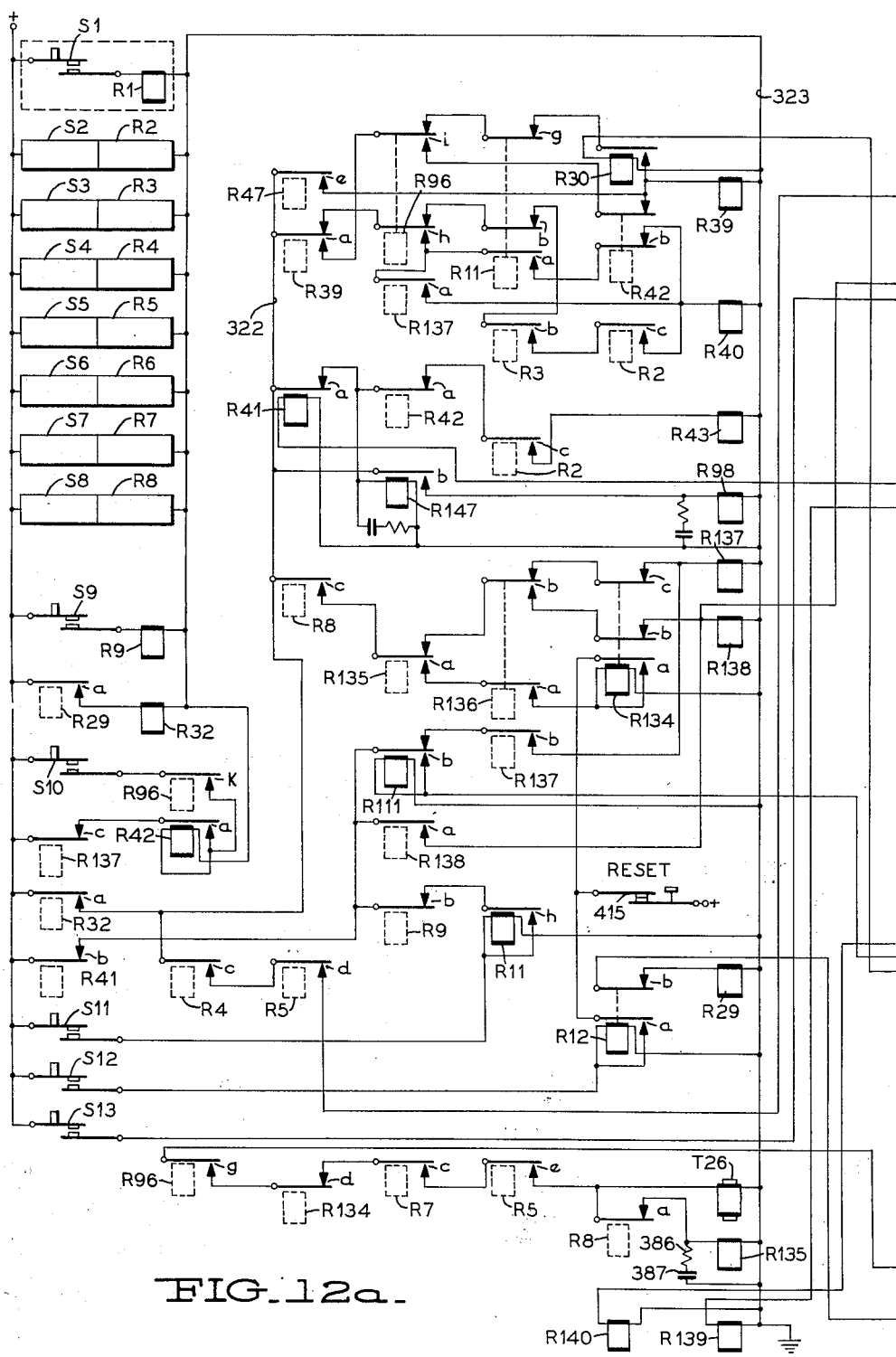

A large number of sensing switches are located adjacent the various mechanisms described previously in order to determine the condition of the same. These have not been shown generally as part of the mechanical structure since this type of switch can be located at any desired position without any necessity for structural changes. Fig. 12a illustrates particularly a great number along the left side of the drawing. At the upper left are a number of boxes which include a circuit such as shown at the extreme upper left portion of the drawing. This circuit illustrates a sensing switch S1 used to complete a circuit through a relay R1 between a plus voltage bus and ground to cause operation of the relay. The sensing switches S2–S8 cooperate with relays R2–R8 in the same manner as previously described. Other sensing switches S9–S13 have been shown as such since the circuit in which they are included includes more than a series arrangement.

Since reference will frequently be made to these switches, the following enumeration of switch and function is given in order to facilitate an understanding thereof:

S1 Wrench drop—closes when spindle 30 moves downward and contacts tool.

S2 Spindle down—spindle 30 positioned to engage threads 111 of a tool 48 when wrenching mechanism is raised, Fig. 2.

S3 Wrenching mechanism 30 closed—jaws 156 are closed, Fig. 3.

S4 Matrix in—matrix 28 positioned beneath spindle 30.

S5 Wrench open—opposite condition of closed as for S3, Fig. 3.

S6 Detent out—detent 99, Fig. 4, removed from detent plate 96. Matrix is free to rotate.

S7 Matrix out—condition shown in Fig. 1.

S8 Photo shutter open—shutter on photocell 41, Fig. 2, is open to admit light.

S9 Spindle up—spindle 30 in highest position, Fig. 1.

S10 Tool tight—tool is secured tightly in spindle 30, Fig. 3.

S11 Tool control—wrenching mechanism 38 in lowest position, Fig. 2.

Figure 15:
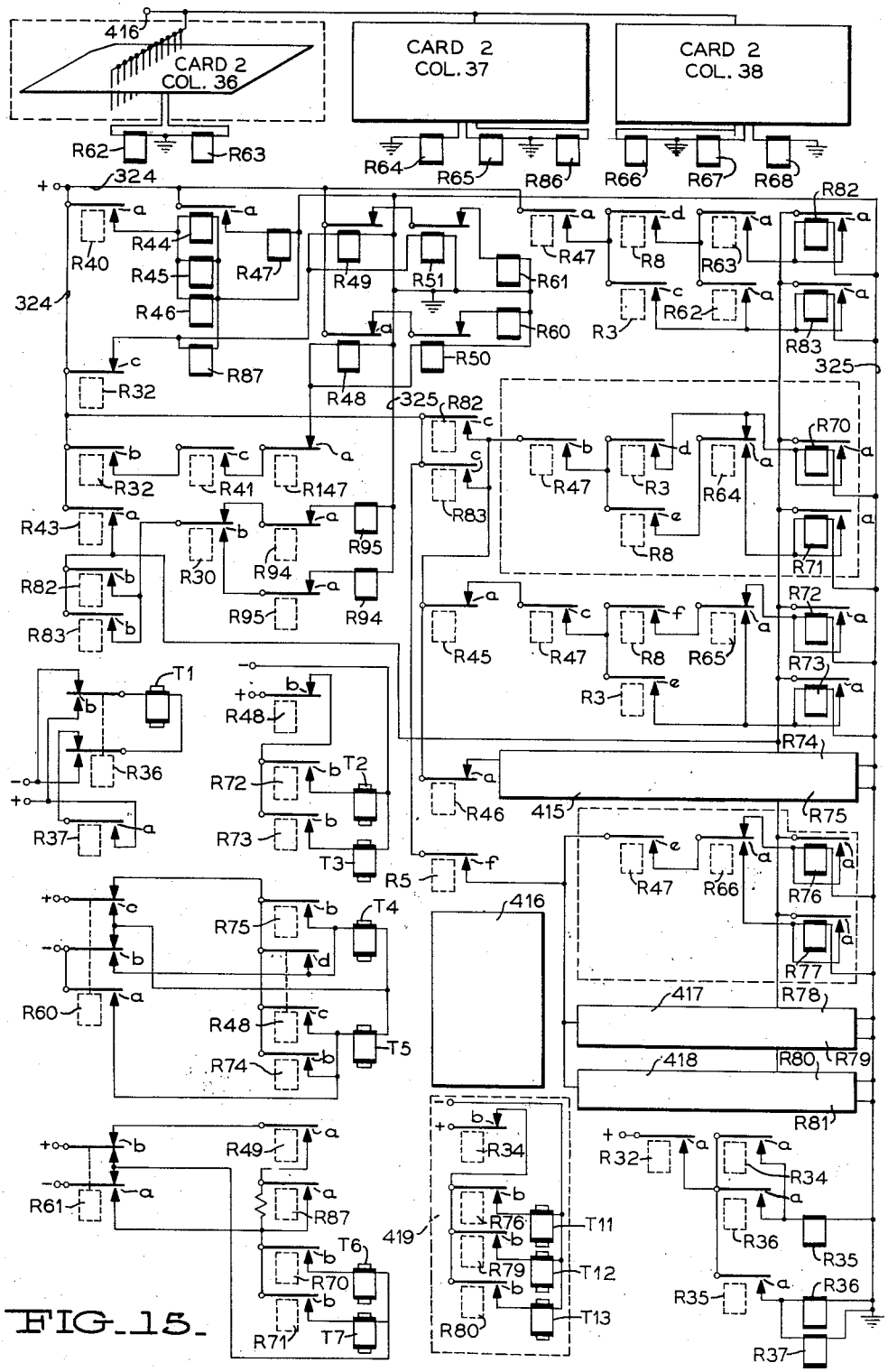

In Fig. 15 is shown a number of solenoid coils numbered T1–T7 and T11–T13 which control the feed and speed motors to give the degree of control which is desired. While the commercial embodiment of the Fosdick jig borer utilizes electro-mechanical apparatus for speed and feed changes, the apparatus shown in Fig. 9 performs in the same manner and is shown in order to complete the description. Insofar as the instant invention is concerned, it is of no importance in what manner the spindle feeds and speeds are determined and the apparatus of Fig. 9 is merely to illustrate an operative embodiment.

To this end, the apparatus of Fig. 9 shows a D.C. shunt motor 251 with a commutator control consisting of a number of resistors 320–324 connected in parallel with a like number of shunting switches so that when a switch is closed the resistor is removed from the circuit and the armature of the motor will draw more current and will rotate at a high velocity. At the input of the motor control a pair of reversing and starting relays, contacts R33b and c, R97a and b, are utilized to reverse the voltage to cause rotation of the motor in one direction or the other.

On the shaft 326 of the motor 251 is connected a gear train 327, 328 for driving the spindle up and down in a conventional manner. Attached to the shaft 329 is a pulse generator which consists of a slotted disc 410 which interrupts a beam of light from light 411 focused on a photocell V6 to generate pulses thereby. The spindle speed control operates in a similar manner and there appears to be no need to illustrate this control.

As mentioned previously, the number of permissible holes in a card such as used in this invention is twelve along the short length of the card and eighty columns of these said sets of holes. In the cycle of operations, which was given in the general description, the tool was in the spindle and the cycle was going to be repeated automatically. In the description of this circuitry, it will be assumed that the positions of the members are the same as they were in Step 1 of the general description and the cycle will be started manually so that it may be seen how operations are initiated.

Start

A start switch 277, Fig. 10, is closed and completes a circuit from plus voltage, through CB1, contacts R16a or R17a (normally closed), card feed clutch 278 to ground. The card feed clutch 278 operates and feeds cards, Fig. 7, into place in the first and second reading station 17 and 18. As the cards are feeding a pretest contact (normal card reader equipment) 279 is closed and a relay R18 is connected in a circuit from plus potential, CB2, pretest contact 279, relay R18 to ground. Relay contact R18a completes a holding circuit to ground upon operation of R18 which bypasses switch 279.

STEP 2

Checking

Relay contact R18b completes a circuit from plus voltage to the common brush inputs 279 and 281 of the comparison and sequence checking circuits of Fig. 10 which include the sensing circuit connections 280 and 282–284. At the same time, R18c completes a circuit from plus potential, CB3 to relays R20, R21 and R22 to ground. These relays operate momentarily to connect potential from R18b, Fig. 10, terminal 276 to input lines 300 and 311, Fig. 11a, by means of contacts R22a and R21a. Relay contact R20a connects potential to input line 312, Fig. 13, in the same manner. The terminal 276 is common to Figs. 10, 11a and 13.

The checking circuits of Fig. 10 are as indicated for comparison and sequence. The comparison of cards 1 and 2, Fig. 7, is to insure that both cards are from the same group so that the workpiece then being bored will have a proper continuity of information relative to the hole desired therein and that successive holes will be bored in the correct sequence. For the comparison check, columns 1–14 are series connected from input 279, card 1, column 1, to the output contacts (one for each possible punch position) to the output contacts of card 2, column 1, to the input line of card 2, column 1, etc., to the input of card 2, column 14 and a relay R16 and ground. If there is a completed circuit, the relay R16 will pick and be held through a hold coil R16H which is connected through CB1 to plus voltage. If a hole were punched in card 1, column 1, which did not correspond to the hole position in card 2, column 1, potential from the line 279 would not pass card 2, column 1, since the potential on a given line of the output of card 1 would not match the hole in card 2.

For the sequence circuit 282–284 comprising columns 17, 16, and 15, a connection from plus potential line 279 is made to the common side of column 17. It is obvious in this case that if card 1 is punched number 124, then card 2 must be punched 125. To this result, the output columns are connected such that a one punch in card 1 (column 17), lowest order, is connected to a 2 punch in card 2 (column 17), ascending order, out through the input side of card 2 to the input side of column 16, card 1. The output terminals of card 1, column 16 are connected to the identical output terminals in card 2, column 16, through a switching network controlled by relay R18. Column 15 utilizes a similar arrangement to column 16.

The difference between columns 15 and 16, and 17, is that column 17 must change for each card while it is only necessary that columns 16 and 15 change for tens and hundreds, respectively. When the reading of card 1 is, for instance, 129, the 9 line 317 from column 17, card 1, is connected to relay R28 to operate this relay. The points of relay R28 are transferred at the output of column 16 to connect the output terminals of card 1 in ascending order to card 2 so that card 2 must have a 3 punch in column 16 in order that relay R17 will operate. R12 is connected in the same manner as R28 and operates when column 16 has a 9 punch therein so that column 16 will have its output contacts arranged in ascending order.

In Fig. 11a, the relay contacts of relay R21 and R22 were closed and transferred for all columns as would be the case for column 22, box 285. With this, the columns 22–27, circuits 285–290, and columns 28–33, circuits 291–296, are each connected in a series circuit as described with reference to the comparison circuit of Fig. 10. If the information contained in each card is the same, the relays R25 and R26 will be operated by an obvious circuit. Columns 22–27, circuits 285–290, as will be remembered, contain the X position coordinate data while columns 28–33, circuits 291–296, contain the Y position coordinate data, X and Y in this description being terms of reference only. Both relays R25 and R26 are equals relay in that when operated they signfy that there is to be no movement in either one or the other direction of the worktable 31, Fig. 2.

In a like maner, the sensing circuits 313 and 315, columns 34 and 35, respectively, of Fig. 13, are connected so that for equal data in cards 1 and 2, the relay R27 will be energized to indiacte that no tool change is necessary.

Controller setup

If the comparison and sequence relays R16 and R17 are operated, the contacts R16b and R17b, Fig. 10, close and complete a circuit from plus voltage, R18c, diode 320, R16b, R17b to R23 and ground. R23 is the program relay and initiates action in the controller for the next operation.

When relay R23 operates, R23b and R23c close, Fig. 12b, and connect plus potential from CB5 to relay R29 and R30 to ground. Relay R29 initiates action for table positioning while R30 initiates the change tool action. Relay R29 is operated by an obvious circuit while R30 is operated through R27a, R31b and the switch 321. The switch 321 may be set either upper or down. When down, the worktable and matrix work together, while when up the worktable is first positioned before a change tool operation is initiated.

At this point, the sensing circuits of Fig. 12a should be considered. With the wrench mechanism 38 open, the sensing switch S5 will be closed and relay R5 will be opearted. In a like manner, relay R7, matrix out, and sensing switch S9, spindle up, will be operated and closed, respectively. Along with these elements the relay contact R29a closes a circuit to the relay R32 which is called the program relay to operate the same.

STEP 3
Spindle down

These relays being operated, and referring to Fig. 14, a circuit is completed from plus voltage, relay contact R7a, relay contact R30a, relay contact R5a, relay contact R2a to the relay R33 and ground. Relay R33 controls the application of voltage to the motor control circuit of Fig. 9 for downward movement of spindle 30. The relay contact R33a makes a circuit from plus voltage to relay R34 and ground. Relay contact R34a, Fig. 15, completes a circuit from plus voltage through R32a, now closed, to relay R35. Relay contact R35a in turn completes a circuit from the same source to relays R36 and R37 which opearte. The contacts R36a and R37a close to operate solenoid T1, Fig. 9, which shunts a resistor 320 and allows the motor to draw enough current to cause movement of spindle 30 to word wrenching mechanism 38.

When the spindle 30 reaches a point adjacent the wrenching mechanism 38, a sensing switch S2 closes to complete a circuit to relay R2 for opeartion, Fig. 12a. When the relay R2 operates, the contact point R2a, Fig. 14, opens and the relays R33 and R34 are de-energized to open the main circuit to the motor 251, Fig. 9, and stop downward movement. The spindle 30 is now fixed in position adjacent the wrenching mechanism 38 as in Fig. 2.

Wrenching mechanism closed

When the relay R2 operates, a circuit is completed, Fig. 14, from plus voltage, relay contacts R30a, now closed, R2b, now closed, R3a to solenoid T14. Solenoid T14 controls the air input to the valve 160, Fig. 3, to close the wrenching mechanism 38. The tool 48 is now held by the wrenching mechanism 38 and secured in spindle 30.

Rotation counterclockwise

When the wrenching mechanism closes, a sensing switch S3 closes to complete a circuit to relay R3 for operation. A circuit is then completed, Fig. 12a, between line 322, connected to plus voltage through R32b, relay contacts R39a, R96h, R11b, R3b, R2c to relay R40 and ground line 323 to operate relay R40. At the same time, a circuit is completed from line 322, relay contacts R41a, R42a, R2c, to relay R43 and line 323 for operation.

Relay contact R40a, Fig. 15, completes a circuit from plus voltage line 324 to relays R44, R45 and R46 to ground line 325 for operation. Relay contact R44a completes a circuit between lines 324 and 325 through relay R47 which operates. Relay contact R47a in turn completes a circuit between line 324, relay contact R3c to relay R83 and ground line 325. Relay 83 closes its contact R83a to hold up relay R83. The relays R44, R45 and R46 are time relays in that they pick instantaneously and drop out sequentially.

The circuit of Fig. 15, as mentioned previously, is used to control the feed and speed of spindle 30. The motor control system for the feed has been shown in Fig. 9. Certain operations of speed and feed are controlled automatically through predetermined circuitry while other speeds and feeds are controlled by columns 36-38 of card 2 as shown at the top of Fig. 15. Since some of the circuit is repetitious, parts have been enclosed in boxes adjacent the particular circuit to which it is similar.

In the card reading arrangement of Fig. 15, either relays R62 or R63 is energized and controls the operation of relay R82 or R83. Relay R64, R65 and R66 are selectively energized to control relays R70, R71, R72, R73 and the relays contained in box 415 which is essentially the same circuit as that shown for relays R72 and R73. The relays contained in box 415 are numbered R74 and R75 but are not shown for simplification purposes. Relays R64, R65 and R86 are the speed control relays for the spindle 30 as are the relays R62 and R63 previously described.

The relays R66, R67 and R68 are the feed control relays and control relays R76, R77 and the relays in boxes 417 and 418. The relays controlled in boxes 417 and 418 are numbered R78, R79, R80 and R81 but are not shown in order to simplify the drawings.

The circuit shown in box 419 is the feed control for spindle 30 where the solenoids T11, T12 and T13 control the motor for the feed control, Fig. 9. The box 416 contains a similar circuit except that instead of relay points of R76, R79 and R80, the relay points of R77, R78 and R81 are used. The circuit in which T1 is connected is also a motor feed control. The remaining circuits of Fig. 15 are utilized to achieve control of the motor speed control (not shown) by means of solenoids T2-T7 by the use of various permutations of relay points as shown for the various solenoids. The operation of these individual circuits is considered to be straight forward.

When relay R47 operates, the contact R47a closes to complete a circuit from plus voltage line 324 to R3c, now closed, to relay R83, which operates. The contact R83c controls the predetermined speeds for exchanging tools in a manner to be described hereinafter. At the same time that relay R47 operated and R83 operated, a circuit to the relay R70, Fig. 15, was completed from line 324, R82c, R47b, R3d, R70 to line 325, the contact of R47 was closing its contacts R47d and R47e and R47f (not shown, in box 415) to condition R73 and R75. Relay contact 47e, Fig. 12a, has completed a circuit to relay R39 for operation which now opens the circuit to relay R40 by means of R39a which transferred. Relay contact R40a, Fig. 15, opens to drop out R44, R45 and R46 sequentially. As R46 closes first, the contact R46a completes a circuit to R75 (not shown), box 415. The relay R45 then closes to complete a circuit to relay R73, which operates. Relays R73 and R75 are held by means of their "a" contacts between lines 324 and 325 by an obvious circuit.

Relay R70 is operated by a circuit from line 324, R83c, closed, R47b, closed, R3d, closed, to relay R70. With relays R70, R73 and R75 operated, the solenoids T6, T3 and T4 will be operated. The relays R60 and R61 were operated by a circuit from line 324 through the contacts of R49 and R51 and contacts of R48 and R50, respectively. Relay R48 is not operated. The circuit for T3 is therefore from plus voltage, R48b, normally closed, R73b to T3 and ground. Solenoids T4 and T6 are operated through similar circuits. The speed control circuit is now completed.

Through the contact R43a, Fig. 15, a circuit is completed from line 324, contact R83b, R30b (now transferred), R95a to the reverse relay R94 which operates the spindle in a counterclockwise direction at a standard change tool speed. As mentioned previously, the motor control for speed control of spindle 30 is not shown but it would be essentially the same as the feed control shown in Fig. 9.

At the same time, Fig. 14, a circuit is completed through a relay point R3g, now closed, through relay point R96a, through relay point R2d, now closed, through a relay point R11c, normally closed, to the air cylinder solenoid T20 which operates to release the air from the wrenching mechanism pistons 145, Fig. 2, to allow the mechanism to be freely movable in a downward direction. As the spindle is rotated in a counterclockwise direction, the wrenching mechanism is forced downward by the disengaging of the threads and subsequently the tool is free and the wrenching mechanism drops down to close the switch S11, Fig. 12a, which closes a circuit to relay R11 and opens, by means of R11c, the circuit to the air cylinder T20, Fig. 14, which allows the wrenching mechanism to rise upward.

*Spindle up*

When switch S11 closed and relay R11 operated, a circuit was completed, Fig. 14, plus voltage, R7a, R96b, R5b, R11e, R9c, to relay R97 and ground. The up relay R97, when energized, completes a circuit to R34 through R97a. The relay R34 completes a circuit, Fig. 15, similar to that described in relation to moving the spindle down. The spindle is moved up until the switch S9 is operated to operate the relay R9, Fig. 12a, which in turn opens the circuit through R9c, previously described, Fig. 14.

STEP 4

*Matrix in*

In Fig. 14 a circuit is completed through the contacts R3g, now closed, R96f, normal, R9a, now transferred, R6a, closed, R4a, now closed, to the matrix in solenoid T18 which operates pressure valves (not shown) to move the matrix in so that the tool now in the wrenching mechanism will be entered into the proper slot. The wrench open solenoid T15 is then operated, Fig. 14, through the contacts R4b, R96c, R5c to the solenoid T15 itself.

With reference to Fig. 12a, it will be noted that the contact R32a is connected through normally open contact R4c, a normally open contact R5d to the relay R31 which indicates when picked that new information for the tool matrix is desired. As the apparatus now stands, the matrix-in relay R4 and the wrench open relay R5 are operated so that the circuit is complete and relay R31 is picked and held through its hold coil.

*Selecting a new tool*

From the relay point R23b, a circuit is now completed through the switch 321, through the contact R27a (normal), through the now transferred point R31b, to the contact R100a (normal), through the closed points R101b, through the now closed point R31a, through the closed point R99a to the line 326 and diode 327 of the tool selector, Fig. 13.

Plus potential is now furnished to the card 2 in the proper two columns for selecting the desired tool, box 313 represents column 34 and box 315 represents column 35. Column 34 has connected therefrom three lines which serve to energize relays 102, 103 or 104 when a particular hole is punched. The lines from card 2, column 35, box 315, are ten in number and are connected to a relay tree 338—339 shown schematically with the relays 102, 103 and 104 of box 338 selecting a particular point on the periphery of the matrix selector for each line contained in cable 329. The box 338 shows the selection of one line out of three for one input line. Box 339 represents the connections for the remaining nine lines which contain the same structure.

It is seen, therefore, that with ten lines and three selectors, a total of thirty selections may be made by use of such a relay tree. The matrix ring, see also Fig. 4, is made up of four concentric commutator segments 356-359, the outermost one, 356, which is split into two parts 356a, 356b, and the two innermost ones, 358, 359, which are utilized to connect potential to the right 356b and the left 356a segment of the outer ring. A single contact point 360 on the outer ring is connected to the next inner ring 357 which is used to sense when the matrix has arrived at a desired position. The two inner rings 358 and 359, which are connected respectively to the divided outer ring, are utilized to move the tool selector in a forward or reverse direction, depending upon which is the shorter of the two routes, to arrive at the desired tool. When the information from the card 2 is used to apply a potential on the outer periphery of the ring, a connection is made, for example on the right side, e.g., line 340, to the innermost ring 359 which operates the relay R105 which is the forward direction relay which in turn closes its point to ground.

At this point, it should be noted that the relay R32 is picked while the relay R96 is not picked so that a connection can be made, plus voltage, R32d, R96e, to the holding point "a" of relay R105 and ground. With reference to Fig. 14, it is seen that relay R105 or R106 closes a circuit to relay R107 or 108 which in turn, Fig. 13, operates a relay R109. This in turn operates a relay R110 and, on Fig. 14, the normally open point R110a closes to operate the matrix detent out solenoid T21.

When the relay R109 operates, the contact R109b closes, Fig. 14, and the condenser 422 charges up. When the relay R110 operates, a contact R110b, Fig. 14, closes to complete a circuit from plus voltage through R6c, now closed, R110b, now closed, to T27. Solenoid T27 controls a clutch 70, Fig. 4, on the matrix head to connect the motor shaft to the matrix shaft. The ring therefore rotates until the single contact on the outer ring makes a connection with the positive voltage contact which has been selected.

The relays R107 and R108 control the application of potential to the windings of a motor 63 in a conventional arrangement. When this occurs, the relay R96, Fig. 13, is operated and closes its own holding contact through relay points R96d, R111a, normally closed, and ground. When the relay contact R96e, Fig. 13, operates, the circuit to R105 or R106 is opened and the matrix and detent is allowed to fall back into place after a suitable time delay as determined by the resistor 361, capacitor 362 combination across the relay R110.

When relay R109 opens the circuit to relay R110, the contact R109b, Fig. 14, opens but the contact R109c closes and the capacitor 422 discharges through R160 to operate this relay. When R160 operates, the contact R160a completes a circuit to R161 which operates to place the resistor 421 in parallel with relay R160. The relay points R160b and R160c complete a circuit to T21 and T27, respectively, so long as relay R160 is held up. This provides a suitable time delay in operating the detent and the clutch.

With reference to Fig. 14, a circuit is completed to operate the wrench closed solenoid T14. The circuit is completed through the matrix-in contact R4b, now closed, through R96c (now transferred) through detent out contact R6b, normally closed, through the wrench close contact R3a to the wrench closed solenoid T14 which operates the wrenching mechanism to secure the tool.

A circuit is completed, Fig. 14, to the matrix out solenoid T16 by contacts R39, now closed, R96f, now transferred, through R7b, normally closed, to the matrix out solenoid T16. The matrix is then moved to the outer position.

With the matrix moved out, the switch S7 will be closed to complete a circuit to R7 to operate the same, Fig. 12a. The contact R7a, Fig. 14, closes to complete a circuit through R96b, now transferred, R112b, R11f to R33 and ground. Relay R34 is operated by the contact R33a completing a circuit from plus voltage to relay R34.

STEP 5

The relay R34 controls the feed of the spindle, as described previously, and the spindle 30 is moved downward. In the process of the spindle 30 moving down-ward, switch S1 will be closed when the tool contacts the spindle to operate R1. When the relay R1 operates, a circuit is completed, Fig. 14, through R3g, now closed, R96a, now transferred R1b, now closed, R11e, normally closed to solenoid T20 which operates to release the air from the wrenching mechanism and allow it to be forced downward ⅝ of an inch which is the length of the tool thread. As the wrenching mechanism reaches the end of its travel, switch S11 closes to complete a circuit to relay R11 which operates and opens the contact R11c in the circuit previously described. Air is then forced into the cylinders of the wrenching mechanism which is forced upward to exert pressure between tool and spindle threads.

Relay R11 also operates the spindle speed at the same velocity as that for removing the tool. The relay R40 is operated through R42b, normally closed, R11a, now closed, R38a, now transferred, R39a to plus line 322. The relay R40 controls spindle speed, Fig. 15, through its point R40a, as described previously. The relay R43, Fig. 12a, is now operated by a circuit from line 322, R41a, normally closed, R42a, normally closed, R2c, now closed, to R43 and ground line 323.

Relay contact R43a, Fig. 15, completes a circuit through R33b, now closed, through R30b, R94a to R95. Relay R30 was de-energized when contact R31b transferred in the circuit which energized relay R30. Relay R95 operates to run the speed motor in the clockwise direction.

When the tool has been drawn up into the spindle and switch S10 on the wrench mechanism has been actuated, which indicates that the tool is tight in the spindle, the relay S10 is operated through contact R38b. When relay R10 operates, the contact R10b, Fig. 14, is closed to complete a circuit through R5c, normally closed, to T15 which operates to open the wrenching mechanism. The tool changing operation is now completed.

*X and Y coordinate positioning*

During the interval in which the tool is being changed, the X and Y coordinate positions of the worktable are being changed to correspond to the new data as determined by card 2, columns 22 through 33. At the bottom of Fig. 12b, a series of relays are shown with the input from relay contact R23b connected in parallel to the transfer contact R25a and R26a. Relay R25 and relay R26, as will be remembered, are the relays which indicate that the X and Y coordinate positions for the first and second cards are the same, Fig. 11a, and there will be no need for moving the worktable. In this example, there was no equality so that the points R25a and R26a are not transferred and a circuit is completed through the contacts of R113a and R114a to the common side of columns 22 through 27 and 28 through 33, lines 363 and 364, Fig. 11a. If desired, the X and Y coordinate positioning may be done serially by raising the time share, X—Y coordinate switch 425 to its upper position so that the relay transfer R26a is not connected to plus potential until relay R113 and R115 have transferred.

The X position, which is the short side of the worktable, has three output lines in the tens position 285, ten in the units position, and ten in all subsequent positions. This allows for a total lateral or X movement of approximately 30 inches. The columns 28 through 33 control the Y or lengthwise position of the worktable and there are four outputs from the tens position which allows approximately 40 inches of travel. The X and Y systems are identical so that only the X will be described.

Figure 11B:
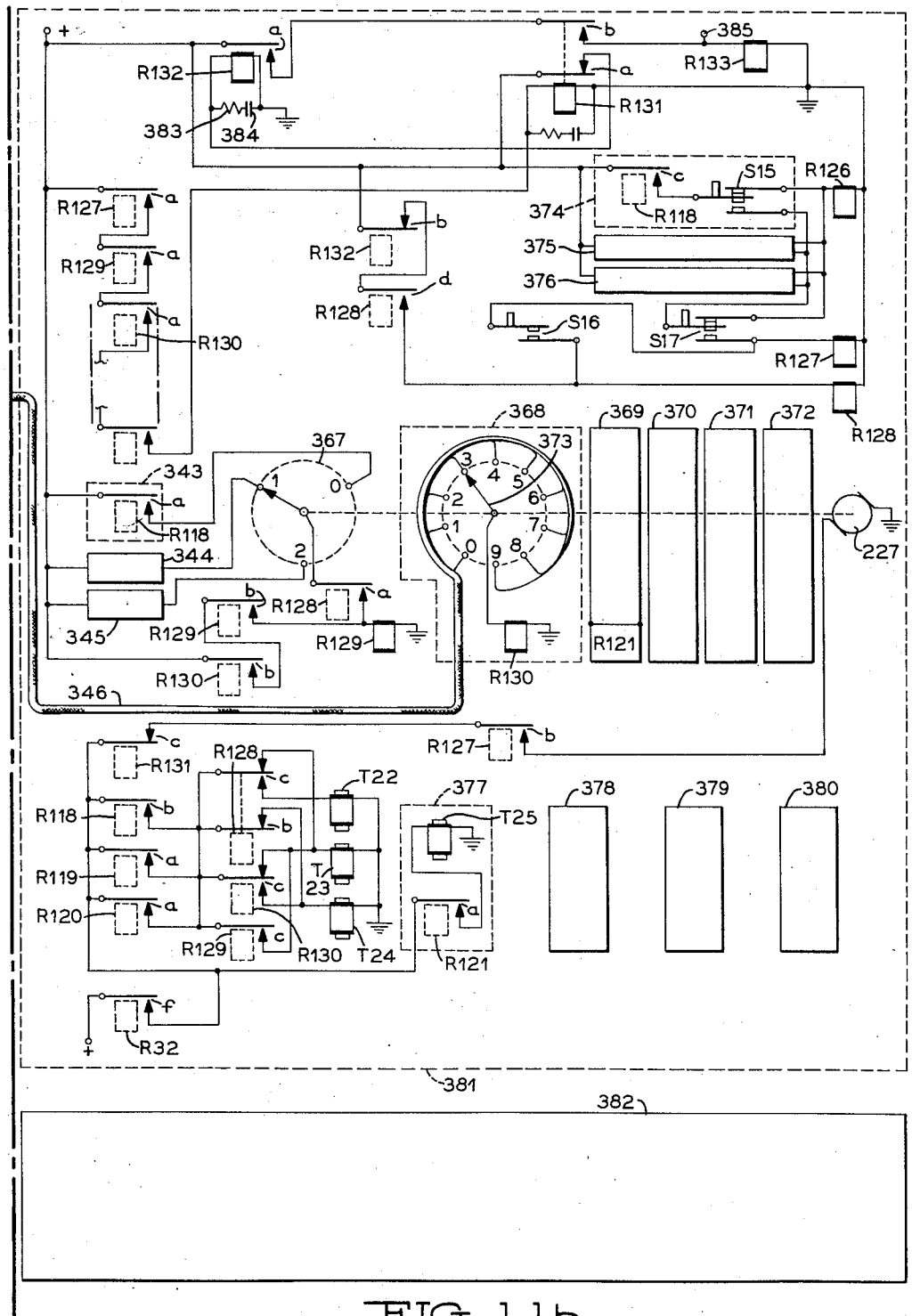

Reference to Fig. 11b shows that the output from the columns 23 through 27, boxes 285–290 is connected respectively to a series of commutators or emitters 367–372 in which a selected point on the periphery thereof is energized and a self-seeking contact, e.g., 373 rotates to detect the contact which has the potential applied thereto. In the case of the tens output from the card reader, relays R118, R119, R120 close "a" points in the emitter circuitry, boxes 343–345 to establish a plus potential for commutator 367. In the Fosdick jig borer, which is used for this operation, the coordinate positions are always determined from the right-hand side and it is necessary in view of the mechanical digital machinery utlized in measuring distances that the table be backed off to a distance which will be no less than the maximum indication which can be received. To this end a series of switches S15 for box 374 shown only, Fig. 11b, are attached to the bed of the machine at 10, 20 and 30 inch intervals from the right-hand side. This allows for a 10 inch movement to the left when the zero relay R118 is energized which would provide for a maximum of 10 inches in measuring rods. With this in mind, the energization of relay R118 closes a contact R118c through the 10 inch switch S15 which, if not actuated, completes a circuit to R126. Relay R126 is a relay used to control the reversing motors on the Fosdick machine. This is accomplished by connecting the contacts of relay R126 across the reversing motor contact in the Fosdick circuitry and closing this circuit by energizing relay R126.

As the table moves back, a switch S17, in the gear train of the table, is actuated after a predetermined travel of the screw thread used to move the table has been rotated and a circuit is completed to relay R127, but relay R127 is not at this time energized since the source of potential must be through the actuated 10 inch switch S15. This switch will not be operated until the table has backed off 10 inches and consequently the dimensioning dials will not revolve until this condition is met. The relay R128 is situated in parallel with the relay R127 through a switch S16 which operates to move the 10 inch positioning rods to their "0" position in a reverse direction. The switch S18, which is in series with the relay R128, is open whenever the 10 inch rods are not set up to their zero position. At the time that the table is backed off sufficiently as indicated by the 10 inch switch S15 being operated, the rods will then be positioned by a series of clutches T22–T25 and those in boxes 378–380 which are controlled by relay R129, R130, R121 plus the relays in 370–372 which are actuated when there is a potential connected therethrough. These relays are connected to the movable contact of the emitter circuits and therefore are operated only when the correct position has been found. The clutch solenoids when energized are effective to engage the clutch, but when de-energized allow the gauging rods to be moved. As the gauging rods are moved into position, the relays R129, R130, R121, etc., are energized which energize the clutches to disengage the drive and in turn, through a series of contacts R127a, R129a, R130a, etc., complete a circuit to R131 which indicates coincidence of the gauge rods in the desired positions.

The relay R131 through its closed point R131a normally energizes a relay R132 which, through its closed point R132a, completes a circuit to the contact R131b. When the relay R131 is energized and opens the circuit to R132, it drops out with a time delay. A circuit will then be completed through R131b to relay R133 which is the signal to position the table in the X direction. A terminal 385 is connected to relay R113 on Fig. 12b which operates to indicate that positioning of the rods has been accomplished.

The relay R133 operates the circuitry shown in the afore-mentioned patent to position the worktable. The Y coordinate positioning arrangement operates in the same manner by means of the circuitry contained in box 382. When the worktable has been properly positioned, a signal appears across relays R115 and R116 from the Fosdick to indicate this fact. The patent shows positioning switches and sensing switches for these functions which are utilized to control or determine the position of various mechanical elements. The switches are generally paralleled with contacts of the relays shown or for sensing switches the relays shown are connected thereto.

Relay R115 and relay R116 are connected into the Fosdick circuitry and operate when the table is positioned both X and Y to transfer their points. Relay R114 is connected to the Y positioning gauging rod apparatus and operates in a manner identical to relay R113. When these relays are all picked, a circuit is traced from relay point R23b, Fig. 12b, through contact R25a, contact R113a, now transferred, R115a, closed, R26a, R114a, R116a to the relay R117 which operates. The R117a completes a circuit from the relay point R23b to a series of points R96g, R134d, R7c, R5e to the shutter open solenoid T26, Fig. 14.

STEP 6

The spindle now holds the selected tool and is approximate the wrenching mechanism. The table is fixed in the desired coordinate position and has completed a circuit to appropriate circuitry to direct that the hole boring operation proceed.

The first step is to open the shutter (not shown) on the photocell and determine if the light source 42 and photocell 41 are working correctly. The solenoid T26, Fig. 12a, controls the shutter and is operated by a circuit from R23b, now closed, R117a, now closed, R96g, R134d, R7c, R5e to T26 and ground. When the shutter opens, a sensing switch S8, Fig. 12a, closes to energize a relay R8 but not before the normally closed contact R8a has completed a circuit to R135. The condenser 387 is charged up in the momentary connection of R135 across the potential source to allow for a time delay before dropout after R8a is opened.

Reference to Fig. 16a will disclose a photodiode 41 and light source 42 which is the apparatus shown beneath the tool storage matrix 27 and jig borer 29, respectively. The cathode of the photodiode is connected to a minus voltage and the anode is connected to the grid of an electron tube V1 and to a plus bias voltage so that if the photodiode 41 does not conduct the tube V1 will conduct. The relay point R8b connects the plate of V1 to the B+ supply through a relay R136. If, when the relay point R8b closes, there is no light on the photodiode 41, the tube will conduct through R136 and R136 will be operated. With reference to Fig. 12a, the relay points R8c, now operated, and R135a, which is momentarily operated, is connected to the normally open contact R136a which in turn controls a relay R134 which is the error signal indicator when the light or photodiode are not working (signal not shown). Therefore, if R136, Fig. 16a, picks through absence of light on the photodiode, R134 will be energized, make its own holding circuit R134a and open the circuits to the relay R137 and to the relay R138. If conditions are correct, relay R136 is not picked, and the relay R135 which was momentarily energized will drop back to its normal position and make a circuit to the relay R137 through R135a. With the relay R137 operated, Fig. 12a, a circuit will be completed to the relay R40 through the contact R137a, the R96h contact, now transferred, and the contact R39a. The relay R40 will control the circuitry of Fig. 15 in the same manner as that mentioned previously for the traverse up and down as controlled by the traverse circuit to relay R33, Fig. 14. As the spindle traverses toward the workpiece, the tool end will break a light beam between light source 42 and photodiode 41 in the circuit mentioned previously, Fig. 16a, and allow the relay R136 to operate, which starts the counter operation.

The counter circuitry shown in Figs. 16a and 16b is preset by information from the holes punched in a card shown in Fig. 16b. The information read into the counter circuit from the card, columns 39–42, determines the depth of feed into the workpiece. Only the apparatus associated with column 39, box 393, has been shown since the remaining circuits, boxes 394–396, are the same except that each box represents a different column of the card to be read. The apparatus contained in box 393 is the counter decade for the measurement .001 to .009 inch. Box 394 measures .01 to .09 inch, box 395 measures .1 to .9 inch, and box 396 measures 1 to 4 inches.

The manually settable switch 424 connects plus potential from line 423, Fig. 12b, when in the sequence of operations, potential is applied thereto. The switch is set in accordance with the distance for which it is desired that the spindle 30 move toward the workpiece 50 before setting the counter to the desired depth of the hole to be bored. It is essentially a safety feature to prevent spurious vibrations from operating the counting mechanism until the tool is proximate the workpiece 50.

Since the numbers punched in the card are in a decimal position code and the counters work on a binary principle, it is necessary that a conversion be made to a radix two number system from the punched card input. Also since the number punched in the card represents the required depth of penetration of the tool and the feed mechanism of the counter generates pulses in accordance with the movement it is desirable to utilize a complementing counter. This may be defined as a counter in which the complement of the number desired is set therein and pulses are then fed therein to operate the counter until overflow. When the overflow occurs, the number of pulses fed therein will represent the original number which was set in the counter as a complement.

To this end, therefore, a complementing translator is placed between the outputs of the different columns and the counters themselves. This essentially consists in breaking down each decimal number in its highest powers of two, i.e., 1, 2, 4 and 8, and making connections between the card output decimal line to as many of the counter stages as desired. As an example, consider the decimal four input line, the 9's complement of 4 is 5 which is then broken up into two lines, one to the four stage and one to the one stage. A diode is connected between each line from the card output and the input to the counter to eliminate back circuits, only V3 and V4 shown.

A series of blocking circuits 388–391 are utilized between the outputs of the diodes and the flip-flops 397–400. Each triode, e.g., V2, is normally biased to nonconduction by the negative bias as shown. When a diode conducts the positive voltage from the input 413 is applied to the grid of the triode in each circuit 388–391 to raise the tube to conduction. Each triode is connected from its plate to the right tube, such as V4 circuit 397, so that when the plate voltage of V2 drops the negative pulse will be applied to tube V4 to cut this tube Off and consequently to reverse the state of the flip-flop comprising tubes V3 and V4. The flip-flops 397–400 are reset to the left side, e.g., V3 nonconducting, and right side, e.g., V4 conducting, by opening up the negative bias control contact R139a to line 401. This conduction state, V3 nonconducting, V4 nonconducting, is defined as a binary "0" while the reverse conduction states are defined as binary "1."

The flip-flops 397–400 are interconnected so that when tube V4 goes from nonconducting, a binary "1" to nonconducting, a binary "0," the negative pulse produced will be connected to the grids of both tubes comprising the next succeeding flip-flop. In this manner each preceding state will operate the succeeding stage when the preceding stage is going from "1" to "0."

The counting chains of four flip-flops are connected together so that they are operated in accordance with the binary sequence. To operate these chains of four in the decade system it is necessary that some modification be made thereto. In this respect it should be noted that the output 402 from stage 1, 397, to stage 2, 398, is also connected to the left tube of stage 8, 400, while the right tube grid 403 of stage 8, 400, is connected to the right tube anode 404 of stage 4. The left-hand tube plate 405 of stage 8, 400, is connected to the grid of a tube V5 between stage 2, 398, and stage 4, 399. If it is assumed that the counter is standing at zero and all left-hand tubes in each stage are nonconducting, pulses into the first stage 397 will change the condition of the first stage 397 so that the plate of the right-hand tube goes up. This positive-going pulse has no effect on the next succeeding stage since the positive pulse will only further saturate the On side grid which will in turn keep the nonconducting side from responding to the incoming positive pulse. When stage 1, 397, is again turned off, a negative-going pulse line 402 is connected to stage 2, 398, to operate the stage and also to the grid 355 of the left-hand tube of stage 8, 400. The left-hand tube of stage 8 is turned "Off," binary "0," so that the negative pulse does not have any effect. These operations continue until the counting circuit indicates 7, 397, is "On," 398 is "On" and 399 is "On." The next pulse which originates from stage 1 is connected as before to the grid 355 of the left-hand tube of stage 8, 400, but this appears before the negative pulse to the grid 403 of the right-hand tube of stage 8, 400, from stage 4, 399, being turned "Off" so that upon termination of the eighth pulse the only stage which is On is stage 8. With stage 8 in the On condition, the plate voltage at 405 of the left-hand tube is down since it is conducting and the grid of the triode V5 connected thereto and V5 is nonconducting. When the tenth pulse arrives in the counter circuit, stage 8 will be turned off transmitting a negative pulse to the first stage of the succeeding decade. Stage two of the first decade will be made ineffective by the auxiliary triode V5 and hence will not turn "On." This happens only if stage 8 has already been turned "On."

With the description given, it will be seen that if a number stored in the card is entered into the counting stages as the complement of the number then a number of pulses into the counter necessary to completely fill the counter will be equal to the number originally stored in the card. In all, there are five separate counting units with the first unit in highest magnitude being the inch register while the remaining four are the decimal values down to 1/1,000. The last counter unit counts to 1/10,000 but is not presettable and acts as a frequency divider for the pulses from the impulse generator. This is shown generally in rectangle 354.

In Fig. 16a, the digitizer 410 connected to the shaft 329, Fig. 9, is shown as a light source 411 and photodiode V6 with the photodiode normally conducting in the presence of light to bias the triode V7 to conduction. This lowers the plate potential of V7 which in turn biases the trigger triode V8 to nonconduction from a normally conducting state to raise the voltage at the plate. This output from the plate of tube V8 is connected to a control grid 427 of an And gate comprising a multi-element tube V10. The shaft digitizer 410 moves and successively interrupts the light. Tube V7 will be alternately turned On and Off and will consequently operate trigger V8, V9, alternately which will in turn alternately condition gate V10 for conduction.

It will be remembered that when the tool in the spindle passes by the checking circuit 41 and 42, the light was interrupted and the tube V1 conducted through the relay R136 which operated to close its contact R136c. The tube consisting of triodes V12 and V13 is a flip-flop and the left tube V12 is connected through a contact R136c to ground. The minus voltage applied to the grid of V13 normally causes nonconduction in this tube. When the relay contact R136c is closed, it connects ground to the grid of tube V12 which causes V12 to switch from conducting to nonconducting. This raises the potential at the plate of V12 connected to the grid 428 of gate V10 to the And gate which allows pulses incident on the other control grid 428 to be reflected on the plate of tube V10 by causing conduction thereof. The plate of V10 is connected to the stage 429 of counter 354 and transmits pulses thereto.

As mentioned previously, this first measurement is utilized to bring the boring tool 48 to a position proximate to the workpiece 50. The distance between the workpiece is known and the tool travel may be determined and fixed as 1, 2, or 3 inches. The nine's complement of this fixed dimension is automatically set into the last or highest order of the counting chain so that the pulse generator must generate a number of pulses equal to this fixed dimension.

In Fig. 16b directly below counting ring 396 is a tube V14 which fires in response to an overflow pulse from this ring. In series with a closed contact R141a is the relay R142 which is operated through R101e and R32e to plus voltage. When relay R142 operates, the point R142c, Fig. 12b, closes a circuit from plus voltage, CB5, R142c to relay R101 and ground. When relay R101 operates, the contact R101a completes a circuit through CB5 to relay R144 and ground. In the sequencing circuit, lower portion of Fig. 12b, the operation of relay R142 completes a circuit from plus voltage, CB5, R23b, switch 321, R27a, R31b, now transferred, R100a, now transferred, R142a, now transferred, line 412 to relay R111 and ground line 323. The relay R139, reset for counters, is also operated through contact R142b. When relay R111 operates, the contact R111a, Fig. 13, in the matrix selector circuits opens the holding circuit for relay R96 to drop this relay. The contact R111b, Fig. 12a, is transferred to open the holding circuit through contact R137b to the relay R137 which drops out. When relay R137 drops out, the contact R137a opens in the holding circuit to relay R40 which then drops out.

When relay R40 drops, the contact R40a opens, Fig. 15, and releases relays R44–R47. Prior to this, when relay R31 operated and closed contact R31b, Fig. 12b, the line 416 was energized, also Fig. 15, to read in the information punched on card 2, columns 36–38. The relay attached to the output lines of the card reader are then selectively energized and selectively close circuits to the data relays R70, R71, etc. The rate of feed was not changed at this time since the relay R34 is operated and by its contact R34b in box 416 and box 419 kept the circuit to the solenoids therein opened. The spindle speed is changed as described previously as the relays R46–R44 drop out sequentially. All operated relays are held energized through contact R43a connecting the plus voltage to the "a" contacts of the data relays.

When relay R137 dropped out, the contact R137d, Fig. 14, in circuit with the relay R33, opened and the relay R33 was de-energized to de-energize relay R34. The contact R34a, Fig. 15, then opened to de-energize relay R35 and subsequently R36 and R37 previously energized through contact R35a. Contacts R36a, R36b and R37b then opened the circuit to the solenoid T1.

The motor control circuit, Fig. 9, opened when relay R137 operated and the spindle 30 is stopped in its downward movement. When relay R144 operates in a manner to be described hereinafter the relay contact R144d closes a circuit to relay R112 which operates and holds up through contact R112a and R143b. The relay R112 closes its contacts R112b and R112c to energize the motor 251 which will thereafter run in accordance with the operation of solenoids T11, T12, etc., until the contact R143b is opened to de-energize relay R112.

In the sequencing circuit, Fig. 12b, the relay contact R142a operated to complete the circuits to the components previously mentioned but drops back to its normal position when relay R101 operates through the resistor-capacitor element adjacent relay R101 retarding the operation of this relay. Relay contact R101e of Fig. 16b completes the circuit for relay R142 when normally closed and opens the circuit to relay R142 when operated.

STEP 7

When relay contact R142a returns to its normal position, Fig. 12b, it completes a circuit through the contacts previously mentioned through R101c and R144c to line 413 which is the input to the counters, Fig. 16b, to set the depth of hole desired. Soon after relay R101 operates, the contact R101a, Fig. 12b, completes a circuit to relay R144 which by its contact R144c transfers plus potential from line 413 to the relay R140, bottom right of Fig. 12a. The contact R140a, Fig. 16b, connects plus potential to a control grid 430 of coincidence tube V11 to condition this tube for operation in response to an output from crystal 414. The crystal 414 forms the essential element of the vibration pickup 43, Fig. 1. This is a piezoelectric crystal suitably mounted to the workpiece 51 and appropriately oriented in regard to the plane of vibrations from the workpiece in response to the impingement of tool 48 to generate an electric signal.

When the relay R96 dropped out the circuit to the solenoid T26, Fig. 12a, was opened by means of contact R96g. The solenoid T26 controls the photo shutter which closes and the switch S8 opens to drop out relay R8. In Fig. 16a, the contact R8b opens and the relay R136 drops out. The contact R136c supplying ground potential to the control grid of tube V1 opens. In Fig. 16a, the operation of relay R101 through its contact R101e released relay R142 and completed a circuit through contacts R144b, R101d, R32e to plus potential so that relay R143 is now placed in circuit with the tube V14.

The crystal 414, mounted on workpiece 50, is oriented so that a voltage is generated when the tool bit strikes or impinges on this workpiece. The output from the crystal is amplified by tubes V15, V16 and V17 and transmitted to another control grid 431 of tube V11. This voltage from the crystal 414 and the condition voltage through contact R140a results in the conduction of tube V11 with the resulting lowering of the plate voltage. This negative pulse to the grid of tube V12 causes the flip-flop composed of tubes V12 and V13 to switch so that tube V12 is nonconducting. The rise in plate voltage of tube V12 is transmitted to the control grid of 428 of tube V10 to condition this tube for conduction, upon receipt of counter pulses on the control grid 427 of tube V10. For each pulse from the pulse generator or shaft digitizer 410, the plate voltage of tube V10 drops to transmit a pulse to the first flip-flop 429 of frequency divider 354. When the counter stages 393–396 are satisfied with the number of pulses from shaft digitizer 410, an overflow pulse from decade counter 396 will fire tube V14. The connection to the last stage of counter 396 is to the terminal 405, as shown in counter 393, and not to terminal 403. This is so since the tube V14 fires on positive excursion pulses and not negative excursion pulses. When tube V14 fires, the relay R143 will be operated through contacts R101a and R32e to plus potential.

When relay R143 operates a circuit is completed, Fig. 12b, from plus voltage, CB5, R23b, switch 321, R27a, R31b, now transferred, R101f, now closed, R143a, now closed, R146a, normal to relay R145 and ground. When relay R145 operates the contact R145a closes to complete a circuit through contact R148d to relay R41, Fig. 12a. Relay R41 operates through its contact R41a to open the circuit to relay R43. Relay contact R43a, Fig. 15, opens and the data relays R82, R83, etc., drop out. This terminates the feed and speed and the tool bit is stationary in the workpiece. The relay R139 is also operated through contact R145a and diode 333 to reset the counters, Fig. 16a.

When the relay R41 was operated, the circuit to relay R147 was opened, Fig. 12a, and after a suitable time delay dependent on the shunting resistor-capacitor combination the relay R147 dropped out to open the circuit to relay R98.

In the spindle feed circuitry, Fig. 14, a circuit through R32b, now closed, R41c, now closed, R147a, closed, is completed to relay R48 and ground. When contact R48a opens, the contact R60 drops out so that spindle speed decreases in speed very rapidly.

STEP 8

When relay R98, Fig. 12a, drops out, the contact R98a closes to complete a circuit, Fig. 14, from plus voltage, contacts R7a, R96b, R98a, R41b, R9c, to relay R97. Relay R97 is energized which completes a circuit to relay R34 and the tool moves upward until switch S13, Fig. 12a, closes to complete a circuit to relay R146, Fig. 12b. When relay R146 operates, a circuit is completed through contact R146a, now transferred, from the circuit described previously to the relay R148 which operates through contact R148b, Fig. 10, to actuate the card feed clutch 278 to feed another card into the card reader.

The circuit breakers CB1—CB5 are operated when the card is fed into the card reader. The normal position for the circuit breakers is 120°. When the clutch 278 is energized, all circuit breakers go through a complete cycle and stop at 120° again. It is to be noted that circuit breakers CB1 and CB5 are normally closed at this point so that during the sequencing operations, the relays R16, R17, R27, R26 and R25 are held operated, if energized, during the preliminary sensing operations. When the cycle of operations is completed and the clutch 278 is energized, the circuit breaker CB1 opens to drop out all relays held through their holding coils, Fig. 10.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A digital data programmed machine tool comprising a boring machine including a worktable movable to any desired coordinate position, a tool receiving spindle movable rotatably and longitudinally; a tool storage matrix positioned adjacent said boring machine and containing a plurality of tools for use in said machine and a controller responsive to said digital data for controlling said storage matrix to bring a selected tool in line with said spindle, for positioning said worktable at a predetermined coordinate position beneath said spindle referable to the selected tool and for operating said spindle to secure said selected tool for operating on said workpiece at said coordinate position.

2. The apparatus of claim 1 wherein said tool storage matrix comprises a flat circular plate contains slots in the periphery thereof, motive means for rotating said plate about a center axis and control means for said motive means including a plurality of stationary contacts, one for each of said slots, selectively energized in accordance with said digital data, a rotatable contact movable in synchronism with said plate for sensing the stationary contact then being energized, and a control circuit responsive to the sensing of said energized contact for locking said plate against further rotation.

3. The apparatus of claim 2 further including a tool sheltering apparatus secured immediately behind each said slot and overlying the same, said apparatus including a pair of spring biased wiper blades separable to accept tools therebetween.

4. The apparatus of claim 3 further including a wrenching mechanism mounted on said boring machine for accepting and tendering said tools with said storage matrix.

5. The apparatus of claim 4 further including a series of sets of positioning gauging rods selectively movable in response to said digital data, each set being responsive to a separable digital datum for moving to a position determined by said datum, said rods being operable to locate said worktable at a desired coordinate position.

6. The apparatus of claim 5 wherein said controller includes a sequencing circuit, said sequencing circuit including means responsive to identities between data representing said immediately preceding tool and the data representing the immediately preceding coordinate position with the data then present for these elements for ignoring said last-mentioned data.

7. A tool storage matrix comprising a plurality of tool supports each occupying a unique coordinate position, a tool accepting mechanism, and motive means for said plurality of tool supports for moving one of said supports immediately adjacent said accepting mechanism, said accepting mechanism being responsive to the presence of said one support for accepting a tool carried in said support.

8. The apparatus of claim 7 further including a flat circular plate wherein said tool supports are slots in the periphery thereof, and means for rotating said plate to a plurality of unique coordinate positions.

9. The apparatus of claim 8 further including a tool sheltering apparatus secured immediately behind each said slot and overlying the same, said apparatus including a pair of spring biased wiper blades separable to accept tools therebetween.

10. A data programmed machine tool comprising a data storage medium containing data respecting the operation of said machine, data reading means for said medium, and a tool storage matrix operable in response to said reading means for interchanging selected tools with said machine.

11. The apparatus of claim 10 further including a wrenching mechanism mounted on siad machine tool for accepting and tendering said tools with said storage matrix.

12. The apparatus of claim 11 in which said data reading means simultaneously reads pairs of said recorded data, means for comparing the data in each pair, tool identity means operable in response to said comparing means upon identical data in said pair, and sequencing means operable in response to the operation of said tool identity means for ignoring said paired data.

13. The apparatus of claim 10 wherein said tool storage matrix includes matrix motive means for moving said matrix to positions determined by said data medium and to positions adjacent to and remote from said machine tool.

14. The apparatus of claim 13 wherein said tool storage matrix consists of a flat circular plate containing slots in the periphery thereof, each slot containing a spring biased tool holder container for securing said tool holder in said slot.

15. A record card programmed jig boring apparatus comprising a jig borer having a worktable positionable to discrete coordinate positions and a tool spindle rotatable at various selected speeds and moving longitudinally at various selected feed rates; a record card reader for sensing data placed in a record card and sequencing means responsive to the positions of the various elements of said jig borer and the data contained in said record card for operatively connecting said card reader with the elements of said jig borer for operation thereby.

16. The apparatus of claim 15 wherein said sequencing circuit comprises means responsive to identities between the data respresenting the coordinate position of said worktable and the data then present to ignore said last-mentioned data.

17. The apparatus of claim 16 further comprising a tool storage matrix positioned in proximity to said jig borer and containing a plurality of tools and motive means for moving said tool matrix beneath the spindle of said boring machine and moving a selected tool in line therewith in accordance with said record card.

18. The apparatus of claim 17 further including a wrenching mechanism secured to said jig borer for interchanging tools between said tool matrix and the spindle of said jig borer.

19. The apparatus of claim 18 wherein said sequencing circuit further includes means responsive to identities in the data representing said immediately preceding selected tool and the data then present to ignore said last-mentioned data.

20. The apparatus of claim 19 including a coordinate position interlock responsive to the positioning of said worktable and the completion of tool changing operations for initiating the spindle feed toward said workpiece.

References Cited in the file of this patent

UNITED STATES PATENTS

| 2,741,732 | Cunningham | Apr. 10, 1956 |
| 2,820,187 | Parsons et al. | Jan. 14, 1958 |

FOREIGN PATENTS

| 758,135 | Great Britain | Sept. 26, 1956 |